US011140645B2

(12) United States Patent
Jean et al.

(10) Patent No.: US 11,140,645 B2
(45) Date of Patent: Oct. 5, 2021

(54) LOCALIZATION, SYNCHRONIZATION AND NAVIGATION USING PASSIVE SENSOR NETWORKS

(71) Applicant: SULU Networks Ltd., Ness Ziona (IL)

(72) Inventors: Oren Jean, Ness Ziona (IL); Anthony Joseph Weiss, Tel-Aviv (IL)

(73) Assignee: SULU Networks Ltd., Ness Ziona (IL)

( * ) Notice: Subject to any disclaimer, the term of this patent is extended or adjusted under 35 U.S.C. 154(b) by 97 days.

(21) Appl. No.: 14/388,808

(22) PCT Filed: Mar. 14, 2013

(86) PCT No.: PCT/IB2013/052020
§ 371 (c)(1),
(2) Date: Sep. 28, 2014

(87) PCT Pub. No.: WO2013/144760
PCT Pub. Date: Oct. 3, 2013

(65) Prior Publication Data
US 2015/0092766 A1    Apr. 2, 2015

Related U.S. Application Data

(60) Provisional application No. 61/617,186, filed on Mar. 29, 2012, provisional application No. 61/755,485, filed on Jan. 23, 2013.

(51) Int. Cl.
*H04W 56/00* (2009.01)
*G01S 5/10* (2006.01)
(Continued)

(52) U.S. Cl.
CPC .......... *H04W 56/002* (2013.01); *G01S 5/021* (2013.01); *G01S 5/0221* (2013.01); *G01S 5/0226* (2013.01);
(Continued)

(58) Field of Classification Search
CPC ...... G01S 19/215; G01S 5/021; G01S 5/0221; G01S 5/0226; G01S 5/0289; G01S 5/06;
(Continued)

(56) References Cited

U.S. PATENT DOCUMENTS

| 5,642,069 A | 6/1997 | Waite |
| 6,064,809 A | 5/2000 | Braatz et al. |

(Continued)

FOREIGN PATENT DOCUMENTS

| WO | 2005002100 A1 | 1/2005 |
| WO | 2007124300 A2 | 11/2007 |

(Continued)

OTHER PUBLICATIONS

European Application # 13768637.4 Search Report dated Nov. 6, 2015.

(Continued)

*Primary Examiner* — Kibrom T Hailu
*Assistant Examiner* — Nizam U Ahmed

(57) ABSTRACT

A method for sensor operation includes deploying a network of sensors (22), which have respective clocks (36) that are not mutually synchronized. At least a group of the sensors receive respective signals emitted from each of a plurality of sources (24, 26), and record respective times of arrival of the signals at the sensors according to the respective clocks. Location information is provided, including respective sensor locations of the sensors. The respective clocks are synchronized based on the recorded times of arrival and on the location information. In the process the sources may be localized, or if the sources are far away, then their directions may be resolved. Sensor positions may also be resolved in the process.

22 Claims, 4 Drawing Sheets

(51) Int. Cl.
*G01S 5/02* (2010.01)
*G01S 5/06* (2006.01)
*G01S 19/21* (2010.01)
*H04L 29/08* (2006.01)
*H04W 64/00* (2009.01)
*G04G 7/00* (2006.01)

(52) U.S. Cl.
CPC .............. *G01S 5/0289* (2013.01); *G01S 5/06* (2013.01); *G01S 5/10* (2013.01); *G01S 19/215* (2013.01); *H04L 67/12* (2013.01); *H04W 56/00* (2013.01); *H04W 64/00* (2013.01); *G04G 7/02* (2013.01)

(58) Field of Classification Search
CPC . G01S 5/10; G04G 7/02; H04L 67/12; H04W 56/00; H04W 56/002; H04W 64/00
USPC ......................................................... 370/350
See application file for complete search history.

(56) References Cited

U.S. PATENT DOCUMENTS

| | | | | |
|---|---|---|---|---|
| 7,714,862 | B1* | 5/2010 | Dwyer | G06T 11/206 345/440 |
| 2001/0004601 | A1 | 6/2001 | Drane et al. | |
| 2002/0044087 | A1 | 4/2002 | Krasner | |
| 2003/0033105 | A1 | 2/2003 | Yutkowitz | |
| 2003/0056136 | A1* | 3/2003 | Aweya | H03L 7/093 713/400 |
| 2004/0030534 | A1 | 2/2004 | Thomas et al. | |
| 2004/0032796 | A1 | 2/2004 | Chu et al. | |
| 2005/0175038 | A1 | 8/2005 | Carlson et al. | |
| 2005/0280578 | A1 | 12/2005 | Boyd | |
| 2007/0005292 | A1* | 1/2007 | Jin | G01S 5/0289 702/150 |
| 2007/0176749 | A1* | 8/2007 | Boyd | G01S 5/021 340/10.1 |
| 2010/0215081 | A1* | 8/2010 | Bajwa | H04B 1/711 375/147 |
| 2010/0271263 | A1* | 10/2010 | Moshfeghi | G01S 5/0263 342/378 |
| 2010/0309054 | A1* | 12/2010 | Pichler | G01S 5/06 342/394 |
| 2011/0234452 | A1 | 9/2011 | Hol et al. | |
| 2011/0285589 | A1 | 11/2011 | Bull | |
| 2012/0129551 | A1* | 5/2012 | Islam | G01S 13/767 455/456.1 |
| 2013/0045759 | A1* | 2/2013 | Smith | H04W 64/00 455/456.6 |
| 2014/0016621 | A1* | 1/2014 | Zhang | G01S 5/06 370/336 |

FOREIGN PATENT DOCUMENTS

| | | |
|---|---|---|
| WO | 2011011118 A1 | 1/2011 |
| WO | 2012003411 A1 | 1/2012 |
| WO | 2012022756 A1 | 2/2012 |

OTHER PUBLICATIONS

International Application PCT/IB2013/052020 Search Report dated Jul. 10, 2013.
Wu et al., "Clock Synchronization of Wireless Sensor Networks", IEEE Signal Processing Magazine, pp. 124-138, Jan. 2011.
Wang et al., "Robust Time-Based Localization for Asynchronous Networks", IEEE Transactions on Signal Processing, vol. 59, No. 9, pp. 4397-4410, Sep. 2011.
Jean et al., "Convex Joint Emitter Localization and Passive Sensor Network Synchronization", 2012 IEEE 7th Sensor Array and Multichannel Signal Processing Workshop, pp. 201-204, year 2012.
Denis et al., "Joint distributed synchronization and positioning in UWB ad hoc networks using TOA", IEEE Transactions on Microwave Theory and Techniques, vol. 54, No. 4, pp. 1896-1911, Apr. 2006.
Boyd et al., "Convex Optimization", Cambridge University Press, year 2004.
Rajan et al., "Joint ranging and clock synchronization for a wireless network", 2011 4th IEEE International Workshop on Computational Advances in Multi-Sensor Adaptive Processing, pp. 297-300, year 2011.
Rydstrom et al., "Clock-offset cancellation methods for positioning in asynchronous sensor networks", 2005 International Conference on Wireless Networks, Communications and Mobile Computing, pp. 981-986, year 2005.
Romer et al., "Towards a Unified View on Space and Time in Sensor Networks", Computer Communications, vol. 28, No. 13, pp. 1484-1497, year 2005.
Simeone et al., "Distributed Synchronization in Wireless Networks", IEEE Signal Processing Magazine, pp. 81-97, Sep. 2008.
Zheng et al., "Joint Time Synchronization and Localization of an Unknown Node in Wireless Sensor Networks", IEEE Transactions on Signal Processing, vol. 58, No. 3, pp. 1309-1320, Mar. 2010.
Grant et al., "CVX: MATLAB Software for Disciplined Convex Programming", Version 1.21, 2 pages, Apr. 2011.
IEEE Standard 802.15.4™—2011, "IEEE Standard for Local and metropolitan area networks—Part 15.4: Low-Rate Wireless Personal Area Networks (LR-WPANs)", 314 pages, Sep. 5, 2011.
International Search Report and the Written Opinion dated Jul. 10, 2013 From the International Searching Authority Re. Application No. PCT/IL2013/052020. (25 Pages).

* cited by examiner

LOCALIZATION, SYNCHRONIZATION AND NAVIGATION USING PASSIVE SENSOR NETWORKS

CROSS-REFERENCE TO RELATED APPLICATIONS

This application claims the benefit of U.S. Provisional Patent Application 61/617,186, filed Mar. 29, 2012, and of U.S. Provisional Patent Application 61/755,485, filed Jan. 23, 2013, both of which are incorporated herein by reference.

FIELD OF THE INVENTION

The present invention relates generally to sensor networks, and particularly to methods and systems for synchronization, localization and navigation using sensor networks.

BACKGROUND

Source localization systems based on Time of Arrival (TOA) are used to locate emitters or reflectors using sensors distributed in an area of interest. The area can be as large as the earth (as in Global Satellite Navigation Systems, GNSS, including the well-known GPS) to very small, such as a room in an office building. Each sensor typically receives signals from emitters in its range, records the times of arrival of the signals, and then reports the results to a computer (at a single location or distributed), which constructs an estimation of the emitter locations. In many systems, the signals are processed to produce Differential Time of Arrival (DTOA) measurements, based on the differences between times of arrival of a signal at different locations. For convenience in the description that follows and in the claims, the term "TOA" is used generically to refer to all forms of measurement of signal times of arrival, including DTOA, unless specifically indicated otherwise. The term "emitter" is used generically to refer to all forms of point energy sources, including bodies that reflect energy.

Sensor synchronization is a key factor in the ability of the computer to find the emitter locations. Synchronization may be maintained by equipping each sensor with a very accurate clock (such as an atomic clock) or a GPS receiver, but these solutions are costly, pose hard constraints on system design, and require extra electrical power. In some systems, synchronization is maintained by two-way messaging or two-way TOA ranging between the sensors, but these approaches also increase the cost, complexity and power consumption of the sensors.

Critical infrastructures such as wireless communication networks, stock trading systems, smart power grids, airport landing guiding systems, and digital broadcast networks, are heavily dependent on GNSS signals for time and positioning. Since the GNSS signal is weak, however, even the smallest jammer can do significant damage to infrastructure, and many jamming events are detected daily around the world. Furthermore, if the operator of the GNSS constellation chooses to shut down its services (or perhaps limit them to certain authorized military users, for example), GNSS-dependent infrastructures will fail.

SUMMARY

Embodiments of the present invention that are described hereinbelow provide methods and systems that use measurements made by a network of unsynchronized sensors to perform accurate synchronization of the sensor clocks, as well as localization and navigation using this sort of synchronization.

There is therefore provided, in accordance with an embodiment of the present invention, a method for sensor operation, which includes deploying a network of sensors, the sensors having respective clocks that are not mutually synchronized. At least a group of the sensors receive respective signals emitted from each of a plurality of sources, and record respective times of arrival of the signals at the sensors according to the respective clocks. Location information is provided, including respective sensor locations of the sensors. The respective clocks are synchronized based on the recorded times of arrival and on the location information.

In a disclosed embodiment, synchronizing the respective clocks includes estimating offsets and skews between the respective clocks.

The method may also include computing the source locations based on the sensor locations and the recorded times of arrival. In a disclosed embodiment, computing the source locations includes applying an estimator to a set of equations relating the recorded times of arrival and the source and sensor locations. Applying the maximum likelihood estimator may include applying an iterative optimization process to the set of the equations, wherein the optimization process derives a set of linear constraints on offsets and skews of the respective clocks based on the received signals. Additionally or alternatively, applying the iterative optimization process includes performing a convex optimization using maximum volume inscribed ellipsoid centering.

In one embodiment, the method includes detecting a fault in the network of the sensors based on the location information and the recorded times of arrival.

Typically, receiving the respective signals includes receiving radio signals, wherein the sources may include at least one satellite source, or possibly three or more satellite sources. Alternatively, the plurality of the sources may include the at least one satellite source and at least one terrestrial source. Synchronizing the respective clocks may then include using the times of arrival of the respective signals emitted from only a single satellite source and a single terrestrial source in order to synchronize the respective clocks of the sensors.

In some embodiments, the method includes finding a location of the at least one terrestrial source based on the recorded times of arrival and/or finding a direction of the at least one satellite source based on the recorded times of arrival.

Typically, the at least one satellite source is not a Global Satellite Navigation Systems (GNSS) satellite. Synchronizing the respective clocks may include detecting an attempt to spoof a satellite source, and discarding the signals received from the spoofed satellite source.

In a disclosed embodiment, synchronizing the respective clocks includes applying an orthogonal decomposition to a measurement space of the satellites.

Additionally or alternatively, receiving the respective signals includes, upon detecting a loss of signal from one of the sources, selecting a new source, and recording the respective times of arrival of the signals from the new source.

In one embodiment, the method includes navigating based on the recorded times of arrival and the location information.

In another embodiment, the sensors are associated with respective computers, and the method includes synchronizing operation of the computers based on synchronization of the respective clocks.

In an alternative embodiment, receiving the respective signals includes receiving acoustic signals.

There is also provided, in accordance with an embodiment of the present invention, a method for transmitter operation, which includes deploying a network of sources, having respective clocks that are not mutually synchronized. At least a group of the sources transmit, at times determined according to the respective clocks, respective signals, which are received by a plurality of sensors, and record respective times of arrival of the signals at the sensors. Location information is provided, including respective source locations of the sources. The respective clocks are synchronized based on the recorded times of arrival and on the location information. The sensors may be located accordingly.

In one embodiment, the network of sources includes base stations in a cellular communications network, and the sensors include user equipment in the cellular communications network, and synchronizing the respective clocks includes synchronizing operation of the base stations based on the signals received by the user equipment.

There is additionally provided, in accordance with an embodiment of the present invention, a method for sensor operation, which includes deploying a network of sensors, the sensors having respective clocks that are not mutually synchronized. At least a group of the sensors receive respective signals emitted from each of a plurality of sources, and record respective times of arrival of the signals at the sensors according to the respective clocks. Location information is provided, including respective sensor locations of the sensors. The source locations are computed based on the recorded times of arrival and on the location information.

There is further provided, a network system, including a network of sensors, which include respective clocks that are not mutually synchronized, and which are configured to receive, in at least a group of the sensors, respective signals emitted from each of a plurality of sources, and to record respective times of arrival of the signals at the sensors according to the respective clocks. A processor is configured to process the recorded times of arrival, using location information including respective sensor locations of the sensors, so as to synchronize the respective clocks.

There is moreover provided, in accordance with an embodiment of the present invention, processing apparatus, including a communications interface, which is configured to receive, from at least a group of sensors in a network of the sensors, which have respective clocks that are not mutually synchronized, times of arrival recorded by the sensors according to the respective clocks of signals emitted respectively from each of a plurality of sources. A processor is configured to process the recorded times of arrival, using location information including respective sensor locations of the sensors, so as to synchronize the respective clocks.

There is furthermore provided, in accordance with an embodiment of the present invention, a computer software product, including a non-transient computer-readable medium in which program instructions are stored, which instructions, when read by a computer, cause the computer to receive, from at least a group of sensors in a network of the sensors, which have respective clocks that are not mutually synchronized, times of arrival recorded by the sensors according to the respective clocks of signals emitted respectively from each of a plurality of sources, and to process the recorded times of arrival, using location information including respective sensor locations of the sensors, so as to synchronize the respective clocks.

Other embodiments provide systems, apparatus and software products that operate in accordance with the other methods laid out above.

The present invention will be more fully understood from the following detailed description of the embodiments thereof, taken together with the drawings in which:

DETAILED DESCRIPTION OF EMBODIMENTS

Overview

Figure 1:
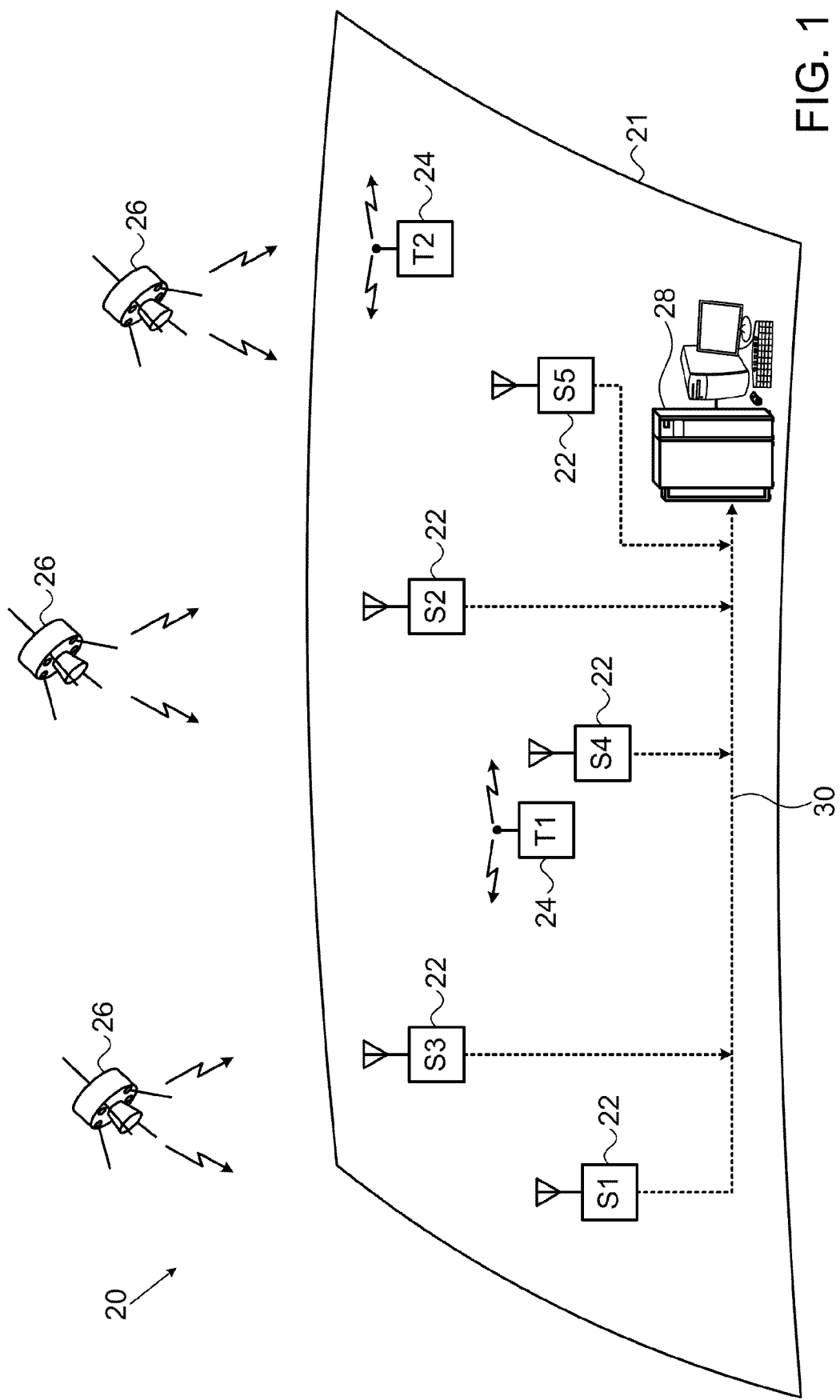
FIG. 1 is a block diagram that schematically illustrates a sensor network, in accordance with an embodiment of the present invention.

Embodiments of the present invention that are described herein derive accurate synchronization from networks of sensors, without requiring that the respective clocks of the sensors themselves be mutually synchronized. In the disclosed embodiments, a group of sensors receives respective signals emitted from multiple sources, which may be terrestrial, space-based (i.e., satellites), or a combination of the two. The sensors record the times of arrival of the signals at the sensor locations according to their respective, unsynchronized clocks.

A processor (which may be centralized or associated with one or more of the sensors) receives and uses the recorded times of arrival, together with known location information, to synchronize the sensor clocks. Typically, this known location information comprises the sensor locations, while the source locations are not known a priori, although some of the source locations may be known. "Synchronizing the clocks," in the context of the present description and in the claims, typically means calculating the offsets and skews between the various unsynchronized sensor clocks, whether or not this synchronization is actually applied by the sensors themselves or only as a part of the computations performed by the processor. In some cases, some of the sensor clocks may be synchronized in advance, while others are not; and the term "synchronizing the clocks," as used in the present description and in the claims, includes cases in which only some of the clocks need be synchronized. As a by-product of the synchronization computation, the processor may also compute the hitherto-unknown source or sensor locations.

In alternative embodiments, the same methods of synchronization and localization may be applied, mutatis mutandis, to a network of unsynchronized emitters. Such techniques may be applied, for example, in synchronizing a cellular communication network, as explained in detail hereinbelow. For simplicity and clarity, the methods described below will refer in detail to the case of sensor synchronization, but the modification of these methods for emitter synchronization will be straightforward for those skilled in the art and is considered to be within the scope of the present invention.

The processor thus synchronizes and calibrates the time offsets and skews of the sensors (or, in alternative embodiments, the emitters) in the system passively, based only on the information that the sensors receive by wireless reception from source transmissions. As a result, the sensors can use inaccurate internal clocks and need only to be capable of measuring the time of arrival of the emitter signals relative to their own clocks and to relay this information to the processor. The sensors can thus be made small and inexpensive, while enjoying very low power consumption. The sources are not generally required to cooperate with the system in any way, thus allowing the use of sources of convenience—such as existing satellite or terrestrial sources, or very simple dedicated signal emitters—which operate in parallel without any interconnection.

Only limited location information need be known in advance for operation of the synchronization methods that are described herein. For example, the known locations (of the sensors or the sources) may be given in absolute terms or only relative to one another. Furthermore, if the locations of a certain number of the sensors (typically at least three) are already known, the remaining sensors can be located if they are allowed to transmit until their locations are estimated to the required accuracy. Alternatively, the sensors of unknown position can be considered navigators, and their positions and clock offsets can be resolved without necessarily ranging transmission on their part.

In some of the embodiments that are described hereinbelow, the processor carries out a process of estimation and optimization, such as maximum likelihood estimation, in order to compute both the offsets (and the skews if any) between the respective clocks and the unknown sensor locations. The possible values of the clock offsets and skews can be linearly constrained by the time of arrival measurements of the source signals. The clock offsets and skews and the unknown locations are estimated by applying an iterative optimization process to a set of equations and constraints relating the recorded times of arrival and the source and sensor locations. For terrestrial sources in particular, convex optimization using maximum volume inscribed ellipsoid centering has been found to give a good starting point for this estimation process. When satellite sources are present, the convex optimization can be replaced by other means, as described in detail hereinbelow.

Embodiments of the present invention are capable of operating with different numbers and configurations of terrestrial and/or satellite signal sources. For example, synchronization is possible in all of the following combinations:
  Satellite sources only (at least three sources);
  Terrestrial sources (at least two, depending on the number of sensors);
  Combination of satellite and terrestrial sources (at least one of each, and only one of each is needed if at least six or seven sensors are used).

Synchronization can be improved by adding sources, as well as sensors. The actual positions of the satellite sources in the sky have only a second-order effect on synchronization and localization accuracy. In every embodiment in which a sensor network is synchronized, this synchronization can be used to localize terrestrial sources, as well as to find the direction of a satellite or navigate a sensor.

Precision of synchronization in sensor networks according to embodiments of the present invention is limited only by the available processing capability and the sensor position accuracy. The precision can be enhanced by increasing the bandwidth, signal/noise ratio, observation time and number of sources processed. The sensor positions may be determined by any suitable means known in the art, such as surveying, localization (if the sensors also transmit signals), or navigation by the methods described herein, assuming that the positions of certain sensors are known and can be used as a reference.

Embodiments of the present invention that use satellite sources of signals provide notable benefits over existing GNSS systems, which are prone to jamming, spoofing and limitations on availability, particularly in crowded urban areas. (Spoofing is the act of a malicious transmitter that transmits a signal mimicking the GNSS signal, causing GNSS receivers to output a different location and/or time from the actual location and/or time.) By contrast with GNSS systems, embodiments of the present invention are capable of exploiting signals from substantially any of the thousands of satellites that roam the heavens, and permit satellite signals to be chosen for this purpose arbitrarily, on the basis of convenience at the time of use. The set of satellite signals that is used may also be changed at any time if and when required, for example if one or more of the signals are lost. The disclosed embodiments provide techniques for satellite-based timing synchronization, localization and navigation that are more robust and less prone to jamming and spoofing than GNSS signals.

Unlike GNSS satellites, whose locations are precisely known and whose signals are tightly controlled, the exact orbital parameters of most satellites in space are not known to great accuracy. The signals they emit have different spectral characteristics and are typically unsynchronized with one another, and their transmission times are not known in advance to the receivers. Embodiments of the present invention overcome these limitations, while taking advantage of the superior geometrical diversity and availability of arbitrary satellite constellations relative to the GNSS constellations. These embodiments provide methods that use the radio-frequency (RF) signals received from the satellites at a network of terrestrial sensors to provide timing synchronization and navigation for a sensor in the area of such a network and provide a superior alternative to GNSS for critical operations. Because the sensors can choose any desired group of satellites, the network is largely immune to jamming, and spoofing can be detected easily due to the deviation of the spoofed signal from the normal signal model. For sensor networks that also process terrestrial signal sources (of known or unknown positions), the synchronization accuracy can be further improved by incorporating measurements of signals from terrestrial sources, such as broadcast signals or wireless user equipment or emitters localized by the system, in the synchronization process.

In some embodiments, localization accuracy finer than the RF carrier wavelength can be achieved, and carrier phase measurements may then be used to refine the location and synchronization estimates still further. Furthermore, the large number of different satellite signals (as well as terrestrial sources) received by the network can be used to derive a stable clock frequency in all of the sensors, thus enabling the sensors to use longer coherent integration times. One of the benefits of extending the coherent integration time is the ability to detect weak signals in high-attenuation environments, such as indoors.

In another embodiment, the methods described in the present patent application are used to estimate the direction (azimuth and elevation) of received satellite signals or other distant sources. These estimates can be applied in satellite orbital tracking, as well as ranging to the satellite when Doppler measurements are also available.

System Description

FIG. 1 is a block diagram that schematically illustrates a sensor network 20, in accordance with an embodiment of the present invention. Sensors 22 (labeled S1, S2, S3, . . . ) are deployed at different, respective locations on a terrestrial surface 21. The sensors receive RF signals transmitted by either terrestrial sources 24 (labeled T1, T2) or satellite sources 26, or both. In some applications of network 20, the locations of sensors 22, or at least of some of the sensors, are known in advance, while the locations of sources 24 and/or 26 are not known a priori. In the description that follows, it will be assumed, for the sake of clarity and convenience, that it is the locations of sensors 22 that are known and used in synchronization and source localization; but the methods described below may be modified in a straightforward manner to perform synchronization and localization based on known source positions.

Sensors 22 are connected by a communication network 30 to a synchronization controller 28, which processes TOA data that is measured and conveyed by the sensors over network 30 in order to perform synchronization, localization, and other related functions that are described herein. Network 30 may comprise any suitable sort of communication network that is known in the art. For example, network 30 may comprise a dedicated, wireline or wireless network. Alternatively or additionally, network 30 may comprise a public network, such as the Internet or a cellular communication network. Although controller 28 is shown and described here as a centralized unit, the functions of the controller may, additionally or alternatively, be performed in a centralized or distributed fashion by processors at different locations on network 30, including processors that are coupled to and associated with one or more of sensors 22. For purposes of the basic methods described below, it is sufficient that sensors 22 transmit their respective TOA data over network 30 to controller 28, without return transmissions of any sort. Return transmission may be useful in some applications, however, for conveying control, synchronization and/or navigation information, for example, from controller 28 to sensors 22.

Although sensor network 20 and the embodiments described hereinbelow operate on the basis of RF signals transmitted by sources 24 and 26, in alternative embodiments (not shown in the figures), sensors 22 may receive and measure times of arrival of signals of other types. For example, sources 24 may comprise acoustic emitters, and sensors 22 may comprise acoustic receivers, which are used in localizing the emitters using the methods described below.

Figure 2:
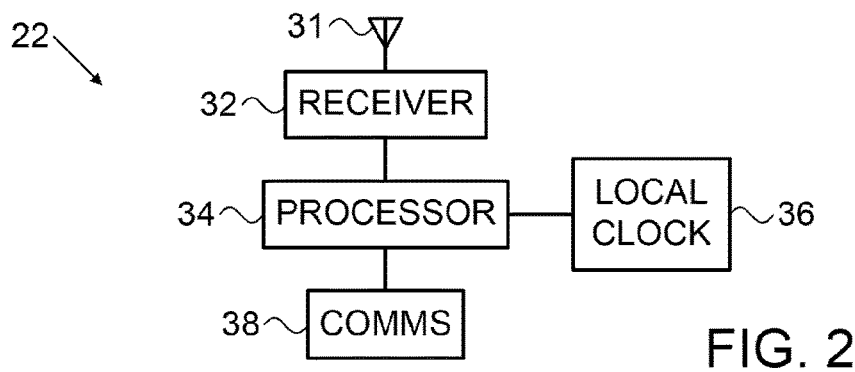
FIG. 2 is a block diagram that schematically illustrates components of a sensor in the network of FIG. 1.

FIG. 2 is a block diagram that schematically shows components of sensor 22, in accordance with an embodiment of the present invention. A receiver 32 receives and amplifies RF signals via an antenna 31 from sources 24 and/or 26. A local processor 34 identifies the incoming signals and measures their times of arrival, based on clock signals provided by a local clock 36. As noted earlier, the TOA measurements may be simple local measurements or differential (DTOA) measurements. Processor 34 transmits the TOA measurement results for the received signals from each of the relevant sources to controller 28 over network 30 via a communications interface 38. Any suitable communication protocol, either standard or proprietary, may be used for this purpose.

As noted earlier, local clock 36 need not be particularly accurate and is generally not synchronized with the local clocks of other sensors. Any suitable sort of oscillator, as is known in the art, may thus be used in generating the clock signal according to which processor 34 makes its TOA measurements. If one or more of sensors 22 has access to absolute-time clock, then this information can be used to propagate the absolute time among the sensors in sensor network 20 after synchronization is established.

Figure 3:
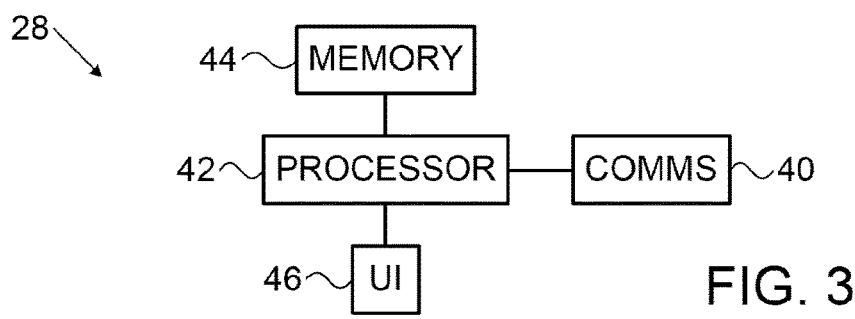
FIG. 3 is a block diagram that schematically illustrates components of a synchronization controller in the network of FIG. 1.

FIG. 3 is a block diagram that schematically shows details of synchronization controller 28, in accordance with an embodiment of the present invention. Controller 28 receives TOA data over network 30 via a communication interface 40. A processor 42 stores relevant data in a memory 44, and computes synchronization and localization results as described hereinbelow. These results may be output via a user interface (UI) 46, for example, or transmitted to sensors 22 or to other items of equipment via interface 40.

Processor 42 and the other components of controller 28 may be parts of a general-purpose computer, which is programmed in software to carry out the functions that are described herein. This software may be downloaded to controller 28 in electronic form, over a network, for example. Alternatively or additionally, the software may be stored in a tangible, non-transitory computer-readable medium, such as optical, magnetic, or electronic memory (which may be incorporated in memory 44). Further alternatively or additionally, at least some of the functions of processor 42 may be carried out by dedicated or programmable hardware logic.

Methods of Operation

Figure 4:
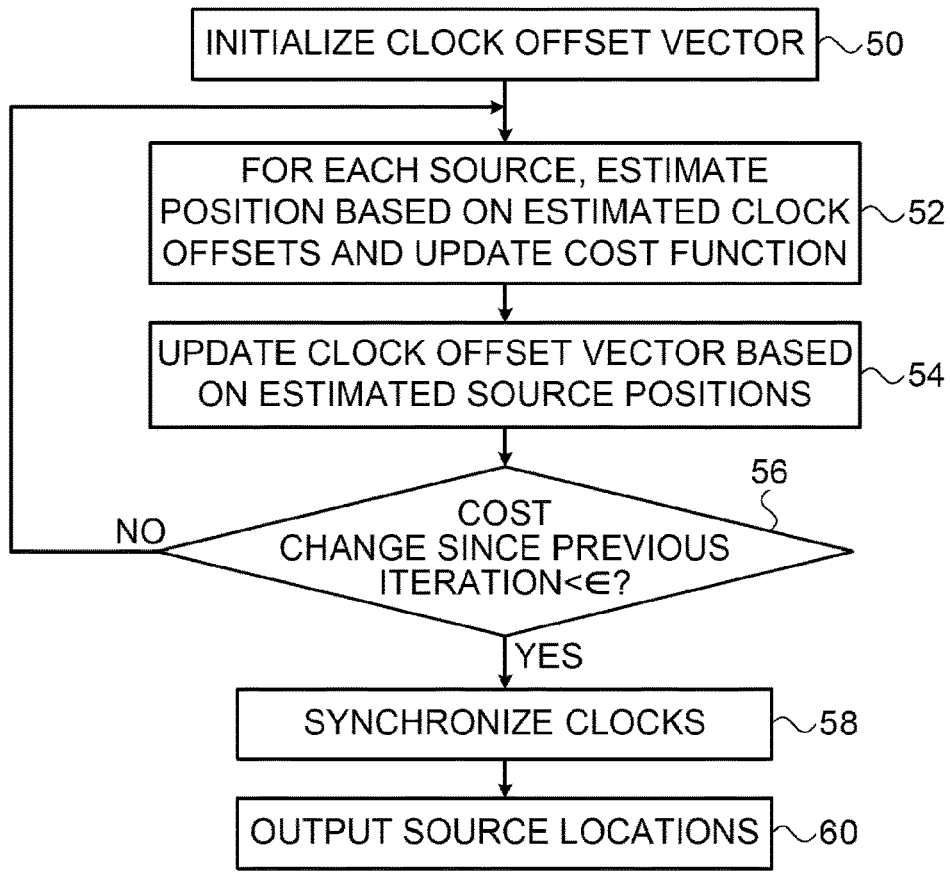
FIG. 4 is a flow chart that schematically illustrates a method for clock synchronization and localization in a sensor network, in accordance with an embodiment of the present invention.

FIG. 4 is a flow chart that schematically illustrates a method for clock synchronization and localization in sensor network 20, in accordance with an embodiment of the present invention. This method synchronizes and localizes a system of M sensors 22 and N sources 24, 26. Certain aspects will be described below initially with reference only to terrestrial sources 24, and will then be expanded to handle satellite sources 26, as well.

To begin the procedure, the clock offset vector and cost function values are initialized, at an initialization step 50. In each iteration n, controller 28 estimates the location of each source t=1, 2, . . . , N based on the estimated clock offsets and the current value of the cost function, at a position estimation step 52. Then, given the estimated source locations, controller 28 updates the clock offset estimates, at a clock update step 54.

To determine whether the estimates have converged sufficiently to terminate the computation, controller 28 compares the new cost value to the cost value from the previous iteration, at a cost evaluation step 56. Specifically, the controller may evaluate whether the change in cost since the previous iteration is less than a certain threshold. If not, n is incremented, and control returns to step 52 for a further iteration.

If the computation is found to have converged at step 56, controller 28 synchronizes the clocks of sensors 22 based on the current value of the estimated clock offsets, at a synchronization step 58. Depending on application requirements, the controller may either send actual synchronization values to the sensors, or it may simply record and apply appropriate corrections to the clock readings received from the sensors. The controller may also output or otherwise apply the current estimate of the source location values, at a location output step 60.

In dealing with satellite sources, it is assumed that sensors 22 are sufficiently close together (typically not more than a few tens of kilometers apart) so that ionospheric and tropospheric effects on the satellite signals can be considered to be uniform. Otherwise, measurements should be corrected by tropospheric and ionospheric correction models or measurements. If the satellite signals occupy a large bandwidth or are scattered over a wide frequency band, the ionospheric correction can be estimated accurately, as is known in the art. Alternatively or additionally, comparison of signals may be limited to measurements from sets of sensors that are close to one another, thus allowing the entire sensor set to be deployed on a wider area.

The subsections that follow will demonstrate a number of different implementations of the method of FIG. 4 to synchronize the sensors:

First, methods using terrestrial sources assuming no skew at the sensor clocks.
Second, methods for handling clock skew in the sensors using terrestrial sources. (Estimating the skew using such methods is unnecessary if satellite sources are present, as correcting the skew using such sources is straightforward.
Finally methods for synchronizing the sensors using both satellite and terrestrial sources.

Note that each subsection has its own notation.

Localization and Passive Sensor Network Synchronization Using Terrestrial Sources—No Clock Skew Consider M sensors and N sources. The s-th sensor has an internal clock offset denoted by $\delta_s$. We use sensor number 1 as a reference sensor and therefore we set $\delta_1=0$. Let $m_t^{(s)}$ be the TOA measurement performed by the s-th sensor for the t-th source. Denote by $q_s$, $p_t$ the known coordinates vector of the sensor and the unknown coordinates vector of the source, respectively. Let $\tau_t$ be the unknown transmit time. Then $$m_t^{(s)} = \frac{1}{c}\|q_s - p_t\| + \tau_t + \delta_s + e_t^{(s)} \quad (1.1)$$

where $e_t^s$ is a random measurement error with zero mean and a standard deviation of $\sigma_t^{(s)}$. Here, for reasons of clarity, we assume $\sigma_t^{(s)} = \sigma_t$, or more precisely, the noise is assumed to be independent and identically distributed (i.i.d). Under this model the problem of self-synchronized localization can be defined as follows: Using all measurements $m_t^{(s)}$ made by the sensor network estimate $\delta_s$, $p_t \forall s,t$ where $s=1, 2, \ldots M$; $t=1, 2, \ldots N$.

The self-synchronized localization problem, in a planar geometry, has 3N+M−1 unknowns: 2N unknown source coordinates, N unknown transmit times and M−1 sensor time offsets w.r.t. the reference sensor. If all sensors receive the signals of all the sources, we have MN TOA measurements. Thus, the problem is well posed if MN≥3N+M−1. Define the vectors associated with source t $$m_t \triangleq [m_t^{(1)}, m_t^{(2)} \ldots m_t^{(M)}]^T$$

$$r_t \triangleq [r_t^{(1)}, r_t^{(2)} \ldots r_t^{(M)}]^T$$

$$r_t^{(s)} \triangleq 1/c\|q_s - p_t\|$$

$$1_M \triangleq [1, 1, \ldots 1]^T$$

$$\delta \triangleq [\delta_1, \delta_2 \ldots \delta_M]^T$$

$$e_t \triangleq [e_t^{(1)}, e_t^{(2)} \ldots e_t^{(M)}]^T.$$

Using the above definitions the measurements defined in (1.1) become, $$m_t = r_t + 1_M \tau_t + \delta + e_t. \quad (1.2)$$

When the error vector is Gaussian i.i.d the Maximum Likelihood cost function is $$Q \triangleq \sum_{t=1}^{N} \|m_t - r_t - 1_M \tau_t - \delta\|^2. \quad (1.3)$$

The cost function is minimized w.r.t. the time offsets by $$\hat{\tau}_t = (1_M^T 1_M)^{-1} 1_M^T (m_t - r_t - \delta) = \frac{1}{M} 1_M^T (m_t - r_t - \delta). \quad (1.4)$$

Substituting this result back in (1.3) yields $$Q = \sum_{t=1}^{N} \left\|\left(I_M - \frac{1}{M} 1_M 1_M^T\right)(m_t - r_t - \delta)\right\|^2 \quad (1.5)$$

$$= \sum_{t=1}^{N} \|B(m_t - r_t - \delta)\|^2$$

$$= \sum_{t=1}^{N} \|(\tilde{m}_t - \tilde{r}_t - \tilde{\delta})\|^2,$$

where $$B \triangleq I_M - \frac{1}{M} 1_M 1_M^T \quad (1.6)$$

$$\tilde{m}_t \triangleq B m_t$$

$$\tilde{r}_t \triangleq B r_t$$

$$\tilde{\delta} \triangleq B \delta.$$

Collecting all vectors for t=1, 2, ..., N we get $$m \triangleq [\tilde{m}_1^T, \tilde{m}_2^T \ldots \tilde{m}_N^T]^T$$

$$r \triangleq [\tilde{r}_1^T, \tilde{r}_2^T \ldots \tilde{r}_N^T]^T$$

$$e \triangleq [\tilde{e}_1^T, \tilde{e}_2^T \ldots \tilde{e}_N^T]^T$$

$$C \triangleq [I_M, I_M \ldots I_M]^T. \quad (1.7)$$

Thus, the cost function for minimization is now $$Q = \|m - r - C\tilde{\delta}\|^2 \quad (1.8)$$

The minimum w.r.t. $\tilde{\delta}$ is obtained for $$\hat{\tilde{\delta}} = (C^T C)^{-1} C^T (m - r) = \frac{1}{N} C^T (m - r) \quad (1.9)$$

Substituting back in (1.8) we get $$Q = \left\| \left[ I - \frac{1}{N}CC^T \right](m-r) \right\|^2, \quad (1.10)$$

Thus, the search is "only" over $\{P_t\}_{t=1}^N$ (2N unknowns). To ensure that the number of equations is not smaller than the number of unknowns, at least two sources and five sensors are required. Thus, solving the above equation for two sources requires a search within a four-dimensional space.

Iterative MLE

Reconsider equation (1.5) and note that if $\delta$ is given the cost function is separable into independent components, one for each source. This enables us to locate each source separately, given the assumed $\delta$ vector. Therefore, the problem can be solved by successive optimization of two-dimensional problems. Using this fact, we can devise the following iterative algorithm for the estimation of the clock offsets and the sources position:
1. Initialize: $\delta^{(0)} \leftarrow 0$; $Q^{(-1)} \leftarrow \inf$; $n \leftarrow 0$
2. $Q^{(n)} \leftarrow 0$
3. For each source $t = 1, 2, \ldots, N$:
   (a) Estimate $p_t$ given $\delta^{(n)}$ using equation (1.5)
   (b) $Q^{(n)} \leftarrow Q^{(n)} + \|(\tilde{m}_t - \hat{r}_t - \delta^{(n)})\|^2$ 4. $\tilde{\delta}^{(n+1)} \leftarrow \frac{1}{N}C^T(m-r)$; See eq. (1.9).

5. If $Q_\Delta^{(n)} = |Q^{(n)} - Q^{(n-1)}| < \epsilon$ then stop
6. Else $n \leftarrow n+1$, go to step 2

Note that if the position of one source is known, then the clock offsets of the sensors that sense it can be estimated directly at the accuracy of the raw measurement. Additional refinement can then be achieved by using that estimation as the initial guess for the $\delta$ vector. A possible source with known location can be a sensor that is also allowed to transmit.

The above algorithm can be used for network-wide synchronization and localization as long as the number of measurements is not smaller than the number of unknowns.

Synchronization by Convex Optimization

Define the M (M−1)/2×M difference matrix, D, where each row consists of a single 1, a single −1 and zeros, such that $Dm_t$ is the vector whose entries are all the possible differences of the entries of $m_t$. Define $\delta'$ such that, $\delta = [0 \; \delta'^T]^T$ and $\tilde{D}$ as the difference matrix, D, with the first column omitted. Applying D to both side of equation (1.2) we get $$Dm_t = Dr_t + D\delta + De_t \quad (1.11)$$
$$= Dr_t + \tilde{D}\delta' + De_t,$$

since $D1_M = 0$, and $\delta_1 = 0$ by definition. Note that $Dr_t$ is the vector holding all possible Time Difference of Arrival (TDOA) measurements. Using the triangle inequality we have $|r_t^{(i)} - r_t^{(j)}| < d^{(i,j)}$, where $d^{(i,j)}$ is the distance between sensor i and sensor j. Collecting all possible pairs, (i, j), the triangle inequality becomes the component wise inequality $-d \preceq Dr_t \preceq d$, where d is a vector whose entries are $d^{(i,j)}$. Applying this result to (1.11) we get, $$\tilde{D}\delta' \preceq Dm_t - De_t + d$$
$$-\tilde{D}\delta' \preceq -Dm_t + De_t + d. \quad (1.12)$$

The set of $\delta'$ vectors satisfying the above constraints form a polyhedron in $\mathbb{R}^{M-1}$ space.

Assuming that $De_t$ is negligible, one can find a $\delta$ vector that satisfies the constraints by solving the Linear Programming (LP) feasibility problem:
Program 1.1 Clock Offset Feasibility Test
Find: $\delta$
Subject to: $\pm \tilde{D}\delta' \preceq \pm Dm_t + d$, $t = 1, \ldots, N$
This problem will return an arbitrary point in the feasible set defined by the constraints. A center point in the set would be favorable since its distance to the real vector will be on average less than any point on the boundary. One way of getting a center point of the polyhedron is finding the Maximum Volume Inscribed Ellipsoid (MVIE), which finds the center coordinates $\delta'_C$ of the biggest ellipsoid s defined as:

$$\epsilon = \{Gu + \delta'_c \mid \|u\| \leq 1, u \in \mathbb{R}^{M-1}, G \in S_{M-1}^{++}\} \quad (1.13)$$

that can fit inside of the polyhedron defined by the constraints. Here $S_{M-1}^{++}$ stands for positive definite M−1×M−1 symmetric matrix. Then the centering program is defined by:
Program 1.2 Maximum Volume Inscribed Ellipsoid Centering on Clock Offsets
Minimize: $\log \det G^{-1}$
Subject to: $\|Ga_i^T\| + a_i \delta'_c \leq b_{t_i}$
   $t = 1, \ldots, N$; $i = 1, \ldots, M(M-1)$
Where:

$$A = [\tilde{D}^T \; -\tilde{D}^T]^T$$

$$b_t = [(Dm_t + d)^T \; (-Dm_t + d)^T]^T \quad (1.14)$$

$a_i$ is the i-th row of A, and $b_{t_i}$ is the i-th element of $b_t$. Note that this optimization problem also returns G, which describes the maximal volume ellipsoid shape. We will use $G^T G$ as a covariance matrix approximation for the estimation error of $\delta'$.

The measure of uncertainty of the estimation of the $\delta$ vector is useful in a number of ways. As noted earlier, given a source of known location, the clock offsets are readily found at raw measurement accuracy. Therefore, if we have a subset of more than three clock offsets estimates with high certainty, we can get a good source position estimation and thus a high-certainty estimation of the clock offsets for all the sensors that received a transmission from this source.

When the noise is significant we cannot discard the term $De_t$ from the constraints in (1.12). If we collect all the constraints related to a given sensor pair we get:

$$\delta_i - \delta_j \leq \min(\{D^{(i,j)}m_t - D^{(i,j)}e_t + d^{(i,j)}\}_{t=1}^N)$$

$$\delta_i - \delta_j \geq \max(\{D^{(i,j)}m_t - D^{(i,j)}e_t - d^{(i,j)}\}_{t=1}^N)$$

where $D^{(i,j)}$ is the row in D that relates to the i, j delta pair. The measurement error vector, $e_t$, is unknown. We can ignore the measurement error and still use the min and max operators, but this approach will result in large errors.

Instead, we introduce a function that encourages small errors, the Pseudo-Likelihood function, which provides the likelihood of a value of $\Delta_{ij} \triangleq \delta_i - \delta_j$ given the constraints imposed on $d^{(i,j)}$ for each sensor pair using all measurements made by the pair. The Pseudo-Likelihood function $f\Delta_{ij}$ of $\Delta_{ij}$ is defined by $$M_t^{(i,j)} \triangleq \min^2\left(\left|m_t^{(i)} - m_t^{(j)} - (x + d^{(i,j)})\right|, \left|m_t^{(i)} - m_t^{(j)} - (x - d^{(i,j)})\right|\right)$$

$$L_t^{(i,j)} \triangleq \begin{cases} 1 & \text{if } \left|x - (m_t^{(i)} - m_t^{(j)})\right| < d^{(i,j)} \\ \exp\left\{-\dfrac{M_t^{(i,j)}}{4\sigma^2}\right\} & \text{otherwise} \end{cases}$$

$$f_{\Delta_{ij}}(x) \triangleq \frac{\prod_{t \in T_{ij}} L_t^{(i,j)}}{\int_{-\infty}^{\infty} \prod_{t \in T_{ij}} L_t^{(i,j)}}$$

where $T_{ij}$ is the set of sources that were measured by both sensor i and sensor j, which here include all sources.

Using the pseudo-likelihood function we can obtain the pseudo-probability that $\Delta_{ij} \in (l_{ij}, h_{ij})$. We select $\Delta \in (l_{ij}, h_{ij})$ so that $\Delta_{ij}$ is within the interval with pseudo-probability $1-\alpha$. Since the pseudo-likelihood is normalized, it has the properties of a probability density function, therefore:

$$\int_{l_{ij}}^{h_{ij}} f_{\Delta_{ij}}(x) dx = 1 - \alpha$$

As there is a degree of freedom in the choice of $l_{ij}$ and $h_{ij}$, these elements will be chosen such that $\|h_{ij} - l_{ij}\|$ is minimized.

When noise is introduced, the ML estimator is such that it is not necessary to estimate the full δ vector, but only its projection Bδ. Estimating Bδ cannot be achieved directly by using MVIE since the domain of Bδ has M−1 non-singular dimensions, making its volume in $\mathbb{R}^M$ always zero for any set of constraints. Therefore any inscribed ellipsoid volume will always be zero, making any volume maximization impossible. To overcome this limitation, we apply the MVIE only to the projection subspace defined by B. This subspace is the span of the eigenvectors of B corresponding to the unity eigenvalues.

We define the matrix V, whose columns are the eigenvectors of B whose corresponding eigenvalues are different from zero. Collecting the likelihood functions $f\Delta_{ij}$ for all i, j, we can derive an estimate for the Bδ vector using MVIE centering. Estimating the Bδ vector using MVIE centering under the constraints imposed by the pseudo-likelihood measure and its inherent singularity requires a modification of Program 1.2:

Program 1.3 Maximum Volume Inscribed Ellipsoid Centering on Clock Offsets Under Pseudo-Likelihood Imposed Bounds Minimize: log det $G^{-1}$
Subject to: $\|Ga_i^T\| + a_i\delta'_c \leq b_i$
i=1, ..., M(M−1)
Return: $\tilde{\delta}_c \leftarrow v\delta'_c$
$\tilde{G} \leftarrow VGV^T$
Where:

$$A = [v^T D^T - v^T D^T]^T$$

$$b = [h_\Delta^T(\alpha) \; l_\Delta^T(\alpha)]^T \quad (1.15)$$

$b_i$ is the i-th element of b; $h_\Delta^T(\alpha)$ and $l_\Delta^T(\alpha)$ are the upper and lower bound vectors imposed by α, via the pseudo-likelihood function on all delta pairs; $\tilde{\delta}_c$ is the MVIE estimate of Bδ; and $\tilde{G}$ describes the uncertainty ellipsoid of the estimation.

Note that A in Program 1.3 is not sparse. If $\delta'_c$ were to be estimated using the MVIE instead of $\tilde{\delta}_c$, then A would be sparse, and would therefore enable lower complexity computation without loss of accuracy.

If Program 1.3 returns the non-feasible token, then the value of a is decreased, and the solution is repeated.

MVIE gives an initial estimation of the target position by embedding the estimated vector in the source measurement model, which gives:

$$Bm_t = B(r_t + e_t) + \tilde{\delta}_c + e\tilde{\delta}_c \quad (1.16)$$

where $e_{\tilde{\delta}_c}$ is the MVIE estimation error of $\tilde{\delta}$. If we model the MVIE estimation error as an independent noise with the covariance matrix $G^T G$, then the initial source position estimate can be found by solving the following weighted least squares (WLS) optimization problem:

$$\operatorname*{argmin}_{x_t, y_t} \left( B(m_t - r_t) - \tilde{\delta}_c \right)^T \Sigma^\dagger \left( B(m_t - r_t) - \tilde{\delta}_c \right)$$

where $\Sigma = G^T G + B\sigma_t^2$, and $\sigma_t^2$ is the measurement noise variance of the source. After locating all of the sources using the above estimator, the computation can jump to step 4 of the iterative ML algorithm presented above and continue iterating until convergence is achieved. Two other possible ways to proceed are 1. Perform gradient ascent on the full ML cost using the MVIE as the initial guess;
2. Use the MVIE initial estimate as the a priori information in maximum a posteriori estimation (MAP).

Using $G^T G$ as a covariance matrix is conservative, since it describes the ellipsoid within which the clock offsets vector almost always lie. Therefore adding a constant factor to the matrix to convert it from a certainty ellipsoid to a covariance matrix is appropriate. Defining the constant factor as κ>1, the covariance matrix for the MVIE clock offset estimation is $$\frac{G^T G}{\kappa}.$$

Methods are known in the art for computing κ to convert certainty ellipsoid to a covariance matrix of a multi-variate normal distribution, but κ can also be determined empirically.

The MVIE/ML estimator performs well under the imposed constraints. The MVIE/ML estimator even after only one ML iteration comes very close to the converged ML performance. This feature makes the combined MVIE/ML estimator very attractive in terms of processing time. Comparing the results of the combined MVIE/ML estimator to the known clock offset case, we observe that even in the first iteration, the penalty of not knowing the clock offsets is not very large. Moreover, even when $\sigma_n$ is on the order of the distance between the sensors (which is a highly nonlinear configuration), the MVIE/ML estimator converges successfully. Moreover the MVIE can also be used as a priori information in a MAP estimator.

To simplify the description above, it was assumed that all sensors intercept all the sources. It is straightforward to extend the above results to the more general case.

Note also that the ML estimator cannot use measurements of sources that are received by three sensors or less, but MVIE can.

One further point to note is that clock bias is actually the measurement bias, meaning that it contains any propagation delays inside of the sensor. For example, a sensor that has an antenna connected with a long cable will include the cable propagation time as part of the bias. In sensing systems, this effect should generally be calibrated. The method described above provides sensor self-calibration of such delays.

2D Bounds on DTOA Measurements

In the previous section, the MVIE used constraints based on measurements of a source by a pair of sensors. This section will present constraints based on measurements of a source by a sensor triplet. Methods to incorporate these constraints into the MVIE will also be introduced.

Let there be three sensors with position coordinates $q_i$. Set direction vectors $v_{ij}$ as:

$$v_{ij} \triangleq q_j - q_i \quad (2.1)$$

Define two angles:

$$\alpha \triangleq \angle(v_{01}, v_{02})$$

$$\beta \triangleq \angle(v_{12}, -v_{01}) \quad (2.2)$$

where the convention is that for vectors $\mu, \nu$ the angle $\angle(\mu, \nu)$ is positive if the $\nu$ direction is restored by counterclockwise rotation of $\mu$ by less than a $\pi$ rad turn. The noiseless DTOA measurement made by a pair sensors on a target positioned at p is defined, in metric units, as:

$$\psi_{ij}(p) = \|p - q_j\| - \|p - q_i\| \quad (2.3)$$

Measurement space is defined as the $R^2$ space $(\psi_{01}, \psi_{02})$. A nine-segment $\{u_i\}_{i=0}^{8}$ path in space is established to map to the bound in measurement space. The path will traverse the plane spanned by vectors $v_{01}, v_{02}$, as follows:

$$u_0(t_0) = q_0 - t_0 v_{01}$$

$$u_1(t_1) = q_0 - t_1 v_{02}$$

$$u_2(t_2) = q_1 + t_2 v_{01}$$

$$u_3(t_3) = q_1 - t_3 v_{12}$$

$$u_4(t_4) = q_2 + t_4 v_{02}$$

$$u_5(t_5) = q_2 + t_5 v_{12}$$

$$u_6(\varphi_0) = q_0 + rT(\varphi_0)v_{01}, \; \varphi_0 \in [0, \alpha]$$

$$u_7(\varphi_1) = q_0 + rT(\varphi_1)v_{01}, \; \varphi_1 \in [\pi-\beta, \pi]$$

$$u_8(\varphi_2) = q_0 + rT(\varphi_2)v_{01}, \; \varphi_2 \in [\pi+\alpha, 2\pi-\beta]$$

$$t_i > 0, \; \forall i \quad (2.4)$$

where r goes to infinity, and $T(\varphi)$ is the rotation matrix for a counter clock wise rotation of $\varphi$ degrees.

Traveling the path segments in space translates to the following path in measurement space:

$$h_0(l_0) = l_0[|v_{01}|, |v_{02}|]^T + (1-l_0)[|v_{01}|, |v_{02}|\cos(\alpha-\pi)]^T$$

$$h_1(l_1) = l_1[|v_{01}|, |v_{02}|]^T + (1-l_1)[|v_{01}|\cos(\pi+\alpha), |v_{02}|]^T$$

$$h_2(l_2) = l_2[-|v_{01}|, |v_{12}|-|v_{01}|]^T + (1-l_2)[-|v_{01}|, -|v_{02}|\cos\alpha]$$

$$h_3(l_3) = l_3[-|v_{01}|, |v_{12}|-|v_{01}|]^T + (1-l_3)[-|v_{01}|\cos\beta, -|v_{02}|\cos(\alpha+\beta)]^T$$

$$h_4(l_4) = l_4[|v_{12}|-|v_{02}|, -|v_{02}|]^T + (1-l_4)[-|v_{01}|\cos\alpha, -|v_{02}|]^T$$

$$h_5(l_5) = l_5[|v_{12}|-|v_{02}|, -|v_{02}|]^T + (1-l_5)[|v_{01}|\cos\beta, |v_{02}|\cos(\alpha+\beta)]^T$$

$$l_i \in [0,1] \forall i$$

$$h_6(\varphi_0) = -[|v_{01}|\cos\varphi_0, |v_{02}|\cos(\alpha-\varphi_0)]^T$$

$$\varphi_0 \in [0, \alpha]$$

$$h_7(\varphi_1) = -[|v_{01}|\cos\varphi_1, |v_{02}|\cos(\alpha-\varphi_1)]^T$$

$$\varphi_1 \in [\pi-\beta, \pi]$$

$$h_8(\varphi_2) = -[|v_{01}|\cos\varphi_2, |v_{02}|\cos(\alpha-\varphi_2)]^T$$

$$\varphi_2 \in [\pi+\alpha, 2\pi-\beta] \quad (2.5)$$

The elementary bound, derived from the triangle inequality, $-|v_{ij}| \leq \psi_{ij} \leq |v_{ij}|$, is directly responsible for the linear part of the bounding path. Therefore the additional information gained by considering two-dimensional bounds is found in the nonlinear part of the bounding path (namely $h_{6,7,8}$).

To avoid the complexity of incorporating the nonlinear bound in the convex optimization described above, it is possible to find the tangents to the nonlinear part of the bound. Each tangent will act as a half-space bound on the offset values. The more tangents we use, the tighter the bound will be, but at the cost of greater complexity.

Bound Tangents

The nonlinear part of the bound is composed of three sections of the ellipse:

$$\psi_{02} = -|v_{02}|\cos(\alpha - \varphi)$$

$$\psi_{01} = -|v_{01}|\cos(\varphi)$$

$$\varphi \in [0, \alpha] \cup [\pi-\beta, \pi] \cup [+\alpha, 2\pi-\beta] \quad (2.6)$$

Taking the partial derivative of $\psi_{01}$ and $\psi_{02}$ by $\varphi$ gives:

$$\frac{\partial \psi_{02}}{\partial \varphi} = -|v_{02}|\sin(\alpha - \varphi) \quad (2.7)$$

$$\frac{\partial \psi_{01}}{\partial \varphi} = |v_{01}|\sin(\varphi)$$

Dividing the two expressions results in:

$$\left.\frac{\partial \psi_{02}}{\partial \psi_{01}}\right|_\varphi = -\frac{|v_{02}|\sin(\alpha - \varphi)}{|v_{01}|\sin(\varphi)} \quad (2.8)$$

The tangent equation is then:

$$\psi_{02} = \psi_{02}\bigg|_\varphi + (\psi_{01} - \psi_{01}|_\varphi)\left.\frac{\partial \psi_{02}}{\partial \psi_{01}}\right|_\varphi \quad (2.9)$$

$$= -|v_{02}|\left(\cos(\alpha - \varphi) + \frac{\sin(\alpha - \varphi)}{\tan\varphi}\right) - \frac{|v_{02}|\sin(\alpha - \varphi)}{|v_{01}|\sin(\varphi)}\psi_{01}$$

$$\triangleq q_0(\varphi) + q_1(\varphi)\psi_{01}.$$

As noted above, there are three segments of the ellipse that are part of the bound. We take K tangents for each segment, evenly spaced in terms of $\varphi$ so that:

$$h_6 : \varphi \in \left\{ \frac{\alpha k}{K+1} \right\}_{k=1}^{K} \quad (2.10)$$

$$h_7 : \varphi \in \left\{ \pi - \beta + \frac{\beta k}{K+1} \right\}_{k=1}^{K}$$

$$h_8 : \varphi \in \left\{ \pi + \alpha + \frac{(\pi - \beta - \alpha)k}{K+1} \right\}_{k=1}^{K}$$

The segments $h_{6,7}$ are always in the lower part of the bound, so that their tangents pose a lower bound, while $h_8$ is always on top, so that its tangents pose an upper bound.

One-Sided Pseudo Likelihood and Tangent Constraints on the Clock Offsets

The bounds on a pair of DTOA measurements made on a single source are related to the set of possible clock offsets. Let the measurement made on a source t by sensor s be:

$$m_t^{(s)} = r_t^{(s)} + \tau_t + \delta_s + e_t^{(s)} \quad (2.11)$$

Define $\tilde{m}_t^{(k,s,p)} \triangleq m_t^{(p)} - m_t^{(k)} - q_1(\varphi)(m_t^{(s)} - m_t^{(k)})$ and $\Delta_{ij} = \delta_j - \delta_i$. Expanding this expression gives:

$$\begin{aligned}\tilde{m}_t^{(k,s,p,\varphi)} &\triangleq m_t^{(p)} - m_t^{(k)} - q_1(\varphi)\left(m_t^{(s)} - m_t^{(k)}\right) \\ &= \psi_t^{(pk)} + \Delta_{kp} - q_1(\varphi)\left(\psi_t^{(sk)} + \Delta_{sk}\right) + \tilde{e}_t \\ &= \psi_t^{(pk)} - q_1(\varphi)\psi_t^{(sk)} + \Delta_{kp} - q_1(\varphi)\Delta_{sk} + \tilde{e}_t \\ &\gtreqless q_0(\varphi) + \Delta_{kp} - q_1(\varphi)\Delta_{sk} + \tilde{e}_t \\ &\triangleq q_0(\varphi) + \tilde{\Delta}_{ksp}^{(\varphi)} + \tilde{e}_t\end{aligned} \quad (2.12)$$

where $\tilde{e}_t \triangleq e_t^{(p)} + (q_1(\varphi) - 1)e_t^{(k)} - q_1(\varphi)e_t^{(s)}$ and $\psi_t^{(ks)} = r_t^{(s)} - r_t^{(k)}$. The last equation defines the relation between the bound on the DTOA measurements and the clock offsets. The direction of the inequality is determined by the value of $\varphi$: For $\varphi \in [0, \alpha] \cup [\pi - \beta, \pi]$ it will be $\geq$ and for $\varphi \in [\pi + \alpha, 2\pi - \beta]$ it will be $\leq$.

To fuse all of the measurements made by all the sensors we again turn to the pseudo likelihood function. The pseudo likelihood function $f_{\tilde{\Delta}_{ksp}^{(\varphi)}}$ of $\tilde{\Delta}_{ksp}^{(\varphi)}$ is defined by:

$$\tilde{m}_t^{(k,s,p,\varphi)} \triangleq m_t^{(p)} - m_t^{(k)} - q_1(\varphi)\left(m_t^{(s)} - m_t^{(k)}\right)$$

$$\Psi(x) \triangleq \exp\left\{-\frac{\left(\tilde{m}_t^{(k,s,p,\varphi)} - q_0(\varphi)\right)^2}{2\tilde{\sigma}_t^2}\right\}$$

$$L_{\tilde{m}_t^{(k,s,p,\varphi)}} \triangleq \begin{cases} 1 & \text{if } x \gtreqless \tilde{m}_t^{(k,s,p,\varphi)} - q_0(\varphi) \\ \Psi(x) & \text{otherwise} \end{cases}$$

$$f_{\tilde{\Delta}_{k,s,p,\varphi}}(x) \triangleq \frac{\prod_{t \in T_{ksp}} L_{\tilde{m}_t^{(k,s,p,\varphi)}}}{\int_{-\infty}^{\infty} \prod_{t \in T_{ksp}} L_{\tilde{m}_t^{(k,s,p,\varphi)}}}$$

where $\tilde{\sigma}_t^2 = 2\sigma_t^2(1 + q_1(\varphi))$, and $T_{ksp}$ is the set of all sensor triplets. The direction of the inequality is determined by the value of $\varphi$ as before. The pseudo likelihood function yields the constraint $$\tilde{\Delta}_{ksp}^{(\varphi)} \gtreqless h_{ksp}^{\varphi}$$

w.p. 1−$\epsilon$. This is a linear constraint on the clock offsets that can be incorporated into the MVIE optimization problem.

Since this is a one-sided constraint, some a priori knowledge is needed on the bound of $\tilde{\Delta}_{ksp}^{(\varphi)}$ on its other side. For this purpose, the bounds can be derived from the elementary bounds, or the lowest feasible value can be used.

Localization and Passive Sensor Network Synchronization Under a Linear Clock Model In this section, the above methods are expanded to include clock skew estimation by convex methods. With slight approximations, the skew estimation is independent of the offset estimation and can be achieved by similar methods.

Consider M sensors and N sources. The s-th sensor has an internal clock with offset denoted by $\delta_s$ and skew denoted by $\theta_s$. We use sensor number 0 as a reference sensor, and therefore we set $\delta_0 = 0$ and $\theta_0 = 1$. Let $m_t^{(s)}$ be the TOA measurement performed by the s-th sensor for the t-th source. Denote by $q_s$, $p_t$ the known coordinate vector of the sensor and the unknown coordinate vector of the source, respectively. Then $r_t^{(s)} \triangleq 1/c \|q_s - p_t\|$ is the propagation time between source t and sensor s. Let $\tau_t$ be the unknown transmit time. Then $$m_t^{(s)} = \theta_s(r_t^{(s)} + \tau_t) + \delta_s + e_t^{(s)} \quad (3.1)$$

where $e_t^{(s)}$ is a random measurement error with zero mean and a standard deviation of $\sigma_t^{(s)}$.

It can be reasonably assumed that all clock skews can be described by a slight deviation from unity that is denoted by $\eta$:

$$\theta_s = 1 + \eta_s \quad (3.2)$$

With reasonable values of $\eta$, it can be shown that $$\theta_s r_t^{(s)} \approx r_t^{(s)} \quad (3.3)$$

is a good approximation since $\eta_s r_t^{(s)} \ll \sigma_t^{(s)}$. For the same reason we will assume that multiplying the noise by any clock skew does not change the noise statistics.

Given this model, the problem of self-synchronized localization can be defined as follows: Using all measurements $m_t^{(s)}$ made by the sensor network, estimate $\delta_s$, $\theta_s$, $p_t \forall s, t$ where $s = 1, 2, \ldots M-1$; $t = 1, 2, \ldots N$.

The self-synchronized localization problem, in a planar geometry, has $3N + 2(M-1)$ unknowns: 2N unknown source coordinates, N unknown transmit times, M−1 sensor time offsets, and M−1 clock skews w.r.t. the reference sensor. If all sensors receive the signals of all the sources, there are MN TOA measurements. Thus, the problem is well posed if $MN \geq 3N + 2(M-1)$. Define the vectors associated with source t, $$m_t \triangleq [m_t^{(1)}, m_t^{(2)} \ldots m_t^{(M-1)}]^T; m_{t0} \triangleq [m_t^{(0)}, 0 \ldots 0]^T;$$

$$r_t \triangleq [r_t^{(1)}, r_t^{(2)} \ldots r_t^{(M-1)}]^T; r_t^{(s)} \triangleq 1/c\|q_s - p_t\|;$$

$$1_M \triangleq [1, 1, \ldots 1]^T; \delta \triangleq [\delta_1, \delta_2 \ldots \delta_{M-1}]^T;$$

$$\theta \triangleq [\theta_1, \theta_2 \ldots \theta_{M-1}]^T; e_t \triangleq [e_t^{(0)}, e_t^{(1)} \ldots e_t^{(M-1)}]^T$$

$$\tilde{\delta} \triangleq \delta \oplus \theta; \tilde{\theta} \triangleq 1_{M-1} \oplus \theta$$

$$A_{\tilde{\delta}} \triangleq [0, I_{M-1}]^T; A_{\tilde{\theta}} \triangleq [0, \text{diag}[m_t]]^T$$

where $\oplus$ is defined as the element-wise division operator. Using the above definitions, the measurements defined in (3.1) become, $$m_{t0} = r_t + 1_M \tau_t + A_{\tilde{\delta}} \tilde{\delta} - A_{\tilde{\theta}_t} \tilde{\theta} + e_r \quad (3.4)$$

When the error vector is Gaussian, the Maximum Likelihood cost function is $$Q \triangleq \sum_{t=1}^{N} \left\| m_{t0} - r_t - 1_M \tau_t - A_{\tilde{\delta}} \tilde{\delta} + A_{\tilde{\theta}_t} \tilde{\theta} \right\|^2. \quad (3.5)$$

The cost function is minimized w.r.t. the time offsets by:

$$\hat{\tau}_t = (1_M^T 1_M)^{-1} 1_M^T (m_{t0} - r_t - A_{\tilde{\delta}} \tilde{\delta} + A_{\tilde{\theta}_t} \tilde{\theta}) \quad (3.6)$$

$$= \frac{1}{M} 1_M^T (m_{t0} - r_t - A_{\tilde{\delta}} \tilde{\delta} + A_{\tilde{\theta}_t} \tilde{\theta})$$

Substituting this result back in (3.5) yields:

$$Q = \sum_{t=1}^{N} \left\| \left( I_M - \frac{1}{M} 1_M 1_M^T \right)(m_{t0} - r_t - A_{\tilde{\delta}} \tilde{\delta} + A_{\tilde{\theta}_t} \tilde{\theta}) \right\|^2 \quad (3.7)$$

$$= \sum_{t=1}^{N} \left\| B(m_{t0} - r_t - A_{\tilde{\delta}} \tilde{\delta} + A_{\tilde{\theta}_t} \tilde{\theta}) \right\|^2$$

$$= \sum_{t=1}^{N} \left\| (\tilde{m}_t - \tilde{r}_t - A_t \tilde{\gamma}) \right\|^2,$$

where $$B \triangleq I_M - \frac{1}{M} 1_M 1_M^T; A_t \triangleq [BA_{\tilde{\delta}}, -BA_{\tilde{\theta}_t}] \quad (3.8)$$

$$\tilde{m}_t \triangleq B m_{t0}; \tilde{r}_t \triangleq B r_t; \tilde{\gamma} \triangleq [\tilde{\delta}, \tilde{\theta}].$$

Collecting all vectors for t=1, 2, . . . ,N gives:

$$m \triangleq [\tilde{m}_1^T, \tilde{m}_2^T \ldots \tilde{m}_N^T]^T; r \triangleq [\tilde{r}_1^T, \tilde{r}_2^T \ldots \tilde{r}_N^T]^T;$$

$$e \triangleq [\tilde{e}_1^T, \tilde{e}_2^T \ldots \tilde{e}_N^T]^T; C \triangleq [A_1, A_2 \ldots A_N]^T. \quad (3.9)$$

Thus, the cost function for minimization is now:

$$Q = \| m - r - C\tilde{\gamma} \|^2 \quad (3.10)$$

The minimum w.r.t. $\tilde{\gamma}$ is obtained for $$\hat{\tilde{\gamma}} = (C^T C)^{-1} C^T (m - r) \quad (3.11)$$

Substituting back in (3.10) gives:

$$Q = \left\| \left[ I - \frac{1}{N} CC^T \right](m - r) \right\|^2, \quad (3.12)$$

As a result, the search is over only $\{p_t\}_{t=1}^{N}$ (2N unknowns). To ensure that the number of equations is not smaller than the number of unknowns, at least three sources and seven sensors are required (for the minimal number of sources). Thus, solving the above equation for three sources requires a search within a 6 dimensional space.

Iterative MLE

Reconsider equation (3.7) and note that if $\tilde{\gamma}$ is given, the cost function is separable into independent components, one for each source. This separation enables controller 28 to locate each source separately, given the assumed $\tilde{\gamma}$ vector. Therefore, the problem can be solved by successive optimization of two-dimensional problems. Using this fact, the following iterative algorithm can be applied for the estimation of the clock offsets and the source positions:

1. Initialize: $\tilde{\gamma}^{(0)} \leftarrow [0_{M-1}^T, 1_{M-1}^T]^T$; $Q^{(-1)} \leftarrow \inf$; $n \leftarrow 0$
2. $Q^{(n)} \leftarrow 0$
3. For each source t=1, 2, . . . , N:
   (a) Estimate $p_t$ given $\tilde{\gamma}^{(n)}$ using equation (3.7).
   (b) $Q^{(n)} \leftarrow Q^{(n)} + \| (\tilde{m}_t - \hat{\tilde{r}}_t - \tilde{\gamma}^{(n)}) \|^2$
4. $\tilde{\gamma}^{(n+1)} \leftarrow (C^T C)^{-1} C^T (m-r)$; See eq. (3.11).
5. If $Q_\Delta^{(n)} = |Q^{(n)} - Q^{(n-1)}| < \epsilon$ then stop
6. Else $n \leftarrow n+1$, go to step 2

Self-Synchronized Localization by Convex Optimization

Controller 28 starts by collecting all measurements made by a pair of sensors k, s. For a source t the measurement of sensor k is given by Eq. 3.1. Taking the difference between the measurements made by sensors k and s on source t gives:

$$m_t^{(k)} - m_t^{(s)} = \theta_k(r_t^{(k)} + \tau_t) + \delta_k + e_t^{(k)} - \theta_s(r_t^{(s)} + \tau_t) - \delta_s - e_t^{(s)} \approx r_t^{(k)} - r_t^{(s)} + \tau_t(\theta_k - \theta_s) + \delta_k + e_t^{(k)} - \delta_s - e_t^{(s)} = \varphi_{t_{ks}} + \tau_t(\theta_k - \theta_s) + \delta_k - \delta_s + e_t^{(k)} - e_t^{(s)} \quad (3.25)$$

where $\varphi_{t_{ks}} \triangleq r_t^{(k)} - r_t^{(s)}$ is the DTOA measurement on source t by sensors k,s.

We define:

$$\Delta_{ks} \triangleq \delta_k - \delta_s$$

$$dm_{t_{ks}} \triangleq m_t^{(k)} - m_t^{(s)} \quad (3.26)$$

The unsynchronized DTOA measurement for source t by sensors k and s is then:

$$dm_{t_{ks}} \approx \varphi_{t_{ks}} + \tau_t(\theta_k - \theta_s) + \Delta_{ks} + e_t^{(k)} - e_t^{(s)} \quad (3.27)$$

Taking the difference between two unsynchronized DTOA measurements of different sources gives:

$$dm_{t_{ks}} - dm_{p_{ks}} \approx \varphi_{t_{ks}} - \varphi_{p_{ks}} + (\tau_t - \tau_p)(\theta_k - \theta_s) + e_t^{(k)} - e_t^{(s)} + e_p^{(s)} - e_p^{(k)} = \varphi_{t_{ks}} - \varphi_{p_{ks}} + (\tau_t - \tau_p)(\theta_k - \theta_s) + \tilde{e}_{t,p}^{(k,s)}$$

where $\tilde{e}_{t,p}^{(k,s)} \triangleq e_t^{(k)} - e_t^{(s)} + e_p^{(s)} - e_p^{(k)}$. When considering a sensor pair, the relative clock skew may be defined as $\Theta_{ks} \triangleq \theta_k / \theta_s$. Applying this concept gives:

$$dm_{t_{ks}} - dm_{p_{ks}} \approx \varphi_{t_{ks}} - \varphi_{p_{ks}} + (\tau_t - \tau_p)(\Theta_{ks} - 1) + \tilde{e}_{t,p}^{(k,s)} = \varphi_{t_{ks}} - \varphi_{p_{ks}} + (\tau_t - \tau_p)(\eta_{ks}) + \tilde{e}_{t,p}^{(k,s)} \quad (3.28)$$

Since in Eq. 3.28, $\tau_t - \tau_p$ is multiplied by the clock skew deviation $\eta$, only a crude estimation of $\tau_t - \tau_p$ is needed to get an accurate clock skew estimation. The following approximation can be used for the Tx time difference:

$$\widetilde{\tau_t - \tau_p} = \frac{1}{M} \sum_{k=0}^{M-1} [m_t^{(k)} - m_p^{(k)}] \triangleq \Delta T_{t,p} \quad (3.29)$$

The summation is over the common sensing sensors of t and p.

Dividing by the estimated time difference gives:

$$\frac{dm_{t_{ks}} - dm_{p_{ks}}}{\Delta T_{t,p}} \approx \frac{\phi_{t_{ks}} - \phi_{p_{ks}}}{\Delta T_{t,p}} + \eta_{ks} + \frac{\tilde{e}_{t,p}^{(k,s)}}{\Delta T_{t,p}} \quad (3.30)$$

Finally we get:

$$\frac{dm_{t_{ks}} - dm_{p_{ks}}}{\Delta T_{t,p}} - \frac{\phi_{t_{ks}} - \phi_{p_{ks}}}{\Delta T_{t,p}} \approx \eta_{ks} + \frac{\tilde{e}_{t,p}^{(k,s)}}{\Delta T_{t,p}} \qquad (3.31)$$

The triangle inequality gives bounds on $\eta_{ks}$:

$$\eta_{ks} + \tilde{n}_{t,p,k,s} \geq \frac{dm_{t_{ks}} - dm_{p_{ks}}}{\Delta T_{t,p}} - \frac{2d_{ks}}{c\Delta T_{t,p}} \qquad (3.32)$$

$$\eta_{ks} + \tilde{n}_{t,p,k,s} \leq \frac{dm_{t_{ks}} - dm_{p_{ks}}}{\Delta T_{t,p}} + \frac{2d_{ks}}{c\Delta T_{t,p}}$$

where $d_{ks} \triangleq \|q_s - q_k\|$.

The pseudo likelihood function provides the likelihood of a value of $\eta_{ks}$ given the constraints imposed by Eq. 3.32 for each sensor pair using all measurements made by the pair. Assuming all measurement noise is i.i.d and has variance of $\sigma_t$, the pseudo likelihood function $f_{\eta_{ks}}$ of $\eta_{ks}$ is defined by:

$$ddm_{t,p}^{(k,s)} \triangleq dm_{t_{ks}} - dm_{p_{ks}} \qquad (3.33)$$

$$M_{t,p}^{(k,s)} \triangleq \min^2 \left( \begin{array}{c} \left| \frac{ddm_{t,p}^{(k,s)}}{\Delta T_{t,p}} + \frac{2d_{k,s}}{c\Delta T_{t,p}} - \eta_{ks} \right|, \\ \left| \frac{ddm_{t,p}^{(k,s)}}{\Delta T_{t,p}} - \frac{2d_{k,s}}{c\Delta T_{t,p}} - \eta_{ks} \right| \end{array} \right)$$

$$\Psi(\eta_{ks}) \triangleq \exp\left\{ -\frac{\Delta T_{t,p}^2 M_{t,p}^{(k,s)}}{8\sigma_t^2} \right\}$$

$$L_{ddm_{t,p}}^{(k,s)} \triangleq \begin{cases} 1 & \text{if } \left| \eta_{ks} - \frac{ddm_{t,p}^{(k,s)}}{\Delta T_{t,p}} \right| < \frac{2d_{k,s}}{c\Delta T_{t,p}} \\ \Psi(\eta_{ks}) & \text{otherwise} \end{cases}$$

$$f_{\eta_{ks}}(x) \triangleq \frac{\prod_{\{t,p\} \in T_{k,s}} L_{ddm_{t,p}}^{(k,s)}}{\int_{-\infty}^{\infty} \prod_{\{t,p\} \in T_{k,s}} L_{ddm_{t,p}}^{(k,s)}}$$

Here $T_{k,s}$ is the set of source pairs that were measured by both sensor k and sensor s, which is assumed here to include all sources. It is assumed that $ddm_{t,p}^{(k,s)}$ are uncorrelated with one another, but this approximation can easily be eliminated. From the pseudo likelihood function, we obtain $E[\eta_{ks}]$, $\mathrm{var}[\eta_{ks}]$, and $\eta_{ks} \in (l_{ks}, h_{ks})$ w.p. $1-\alpha$.

The estimation for the relative clock skew is given by $\hat{\Theta}_{ks} = 1 + \hat{\eta}_{ks}$. Therefore, bounds that were found on $\eta_{ks}$ can be translated into bounds on $\Theta_{ks}$. If $\eta_{ks} \in (l_{ks}, h_{ks})$ w.p. $1-\alpha$, then $\Theta_{ks} \in (1+l_{ks}, 1+h_{ks})$ w.p. $1-\alpha$. Taking the natural logarithm of the inequalities imposed on $\Theta_{ks}$ gives the following set of linear constraints on $\ln \theta_k$:

$$\ln \Theta_{ks} = \ln \theta_k - \ln \theta_s \in [\ln(1+l_{ks}), \ln(1+h_{ks})] \text{ w.p. } 1-\alpha. \qquad (3.34)$$

Collecting the linear constraints for all k, s sensor pairs, Maximum Volume Inscribed Ellipsoid (MVIE) centering can be used to find the estimate $\widehat{\ln \theta}$, and the related error covariance matrix can be approximated by $G_{\ln \Theta} G_{\ln \Theta}^T$.

Program 3.1 Maximum Volume Inscribed Ellipsoid Centering on Clock Skews Under Pseudo Likelihood Imposed Bounds Minimize: $\log \det G_{\ln \Theta}^{-1}$
Subject to: $\|G_{\ln \Theta} a_i^T\| + a_i \ln \theta_c \leq b_i$
$i = 1, \ldots, M(M-1)$
Where:

$$A = [\tilde{D}^T - \check{D}^T]^T$$

$$b = [h_{\ln \Theta}^T(\alpha) \; l_{\ln \Theta}^T(\alpha)]^T \qquad (3.35)$$

$b_i$ is the i-th element of b, and $h_{\ln \Theta}^T(\alpha)$ and $l_{\ln \Theta}^T(\alpha)$ are the upper- and lower-bound vectors imposed by $\alpha$, via the pseudo likelihood function, on all relative clock skews.

If the program returns the non-feasible token, the value of $\alpha$ can be decreased, and the solution repeated.

Note that $G_\Theta = G_{\ln \Theta}$, since the error is much smaller then unity, and Taylor approximation holds firmly. Therefore, the estimator of the $\theta$ vector is:

$$\hat{\theta} = \exp(\widehat{\ln \theta}); \; G_\Theta = G_{\ln \Theta} \qquad (3.36)$$

After establishing an estimation of the clock skew vector $\hat{\theta}$ and deriving an approximation for its error covariance matrix: $G_\Theta G_\Theta^T$, the next step is to estimate the clock offset vector $\delta$. For this purpose, the measurements made by the sensors are normalized by their respective clock skew estimates as follows:

$$\tilde{m}_t^{(s)} = \frac{m_t^{(s)}}{\hat{\theta}_s} = \frac{\theta_s}{\hat{\theta}_s}(r_t^{(s)} + \tau_t) + \frac{\delta_s}{\hat{\theta}_s} + e_t^{(s)} \qquad (3.37)$$

Applying Taylor approximation to $$\frac{\theta_s}{\hat{\theta}_s}$$

gives $$\frac{\theta_s}{\hat{\theta}_s} \approx 1 - e_{\theta_s},$$

where $e_{\theta_s}$ is the estimation error of $\hat{\theta}_s$. Embedding this approximation into Eq. 3.37 results in:

$$\tilde{m}_t^{(s)} = (1 - e_{\theta_s})(r_t^{(s)} + \tau_t) + \frac{\delta_s}{\hat{\theta}_s} + e_t^{(s)} \qquad (3.38)$$

$$= r_t^{(s)} + \tau_t + \frac{\delta_s}{\hat{\theta}_s} - e_{\theta_s}(r_t^{(s)} + \tau_t) + e_t^{(s)}$$

$$\approx r_t^{(s)} + \tau_t + \frac{\delta_s}{\hat{\theta}_s} - e_{\theta_s} \tau_t + e_t^{(s)}$$

The above equation states that the clock skew uncertainty is amplified by the source transmit (Tx) time. The Tx time can be referenced to a selected point in time. To minimize the noise amplification effect, the reference time can be set to the mean of the Tx times of all of the sources. Then $\tau_t$ may be estimated by:

$$\tau_0 \triangleq \frac{1}{N} \sum_{k=1}^{N} m_k^{(0)} \qquad (3.39)$$

$$\hat{\tau}_t = m_t^{(0)} - \tau_0$$

Using the above first-order approximation of $\tau_t$, the equivalent measurement difference noise for sensors k and s is:

$$\sigma_{ks} = \sqrt{\frac{\hat{\tau}_t^2 v_{ks}^T G_\theta G_\theta v_{ks}}{4} + 2\sigma_t^2} \qquad (3.40)$$

where $v_{ks}^T$ is a difference vector holding 1 and −1 in the k−1, s−1 rows respectively, and containing zeros elsewhere. (If s=1, then the −1 is missing from the vector.)
Given $\sigma_{ks}$ the pseudo likelihood measure can be applied to give bounds on $$\tilde{\Delta}_{ks} \triangleq \frac{\delta_k}{\hat{\theta}_k} - \frac{\delta_s}{\hat{\theta}_s} \triangleq \tilde{\delta}_k - \tilde{\delta}_s$$

for every s,k. The $\tilde{\Delta}$ pseudo likelihood measure is defined as follows:

$$d\tilde{m}_t^{(i,j)} \triangleq \tilde{m}_t^{(i)} - \tilde{m}_t^{(j)}$$

$$M_t^{(i,j)} \triangleq \min^2\left(|d\tilde{m}_t^{(i,j)} - (x + d^{(i,j)})|, |d\tilde{m}_t^{(i,j)} - (x - d^{(i,j)})|\right)$$

$$\Psi(x) \triangleq \exp\left\{-\frac{M_t^{(i,j)}}{2(\sigma_{ij}^2)}\right\}$$

$$L_{d\tilde{m}_t} \triangleq \begin{cases} 1 & \text{if } |x - d\tilde{m}_t^{(i,j)}| < d^{(i,j)} \\ \Psi(x) & \text{otherwise} \end{cases}$$

$$f_{\tilde{\Delta}_{ij}}(x) \triangleq \frac{\prod_{t \in T_{ij}} L_{d\tilde{m}_t}}{\int_{-\infty}^{\infty} \prod_{t \in T_{ij}} L_{d\tilde{m}_t}}$$

where $T_{ij}$ is the set of sources that were measured by both sensor i and sensor j (taken to include all sources, as noted earlier). The pseudo likelihood function also gives $E[\tilde{\Delta}_{ij}]$, $\text{var}[\tilde{\Delta}_{ij}]$, and $\tilde{\Delta}_{ij} \in (l_{ij}, h_{ij})$ w.p. 1−α.
Collecting the likelihood functions $f_{\tilde{\Delta}_{ij}}$ for all i, j, the $\tilde{\delta}$ vector can be estimated using the error covariance matrix approximation $G_{\tilde{\delta}} G_{\tilde{\delta}}^T$ by using MVIE centering:
Program 3.2 Maximum Volume Inscribed Ellipsoid Centering on Clock Offsets Under Pseudo Likelihood Imposed Bounds
Minimize: $\log \det G_{\tilde{\delta}}^{-1}$
Subject to: $\|G_{\tilde{\delta}} a_i^T\| + a_i \tilde{\delta}_c \le b_i$
i=1, . . . , M(M−1)
Where:

$$A = [\tilde{D}^T - \tilde{D}^T]^T$$

$$b = [h_{\tilde{\Delta}}^T(\alpha) \, l_{\tilde{\Delta}}^T(\alpha)]^T \qquad (3.41)$$

$h_{\tilde{\Delta}}^T(\alpha)$ and $l_{\tilde{\Delta}}^T(\alpha)$ are the upper- and lower-bound vectors imposed by α, via the pseudo likelihood function, on all δpairs.

From $\tilde{\delta}_c$, an estimate of δ can be computed by multiplying it element-wise by $\hat{\theta}$:

$$\hat{\delta} = \tilde{\delta}_c \odot \hat{\theta} \qquad (3.42)$$

This multiplication cancels the prior normalization and therefore introduces no additional errors.
Having estimated $\hat{\theta}$ and $\hat{\delta}$ with their respective approximations of the error covariance matrices, $G_\theta G_\theta^T$, and $G_\delta G_\delta^T$, the skew and bias can be removed from the sensor measurements as follows:

$$\tilde{\tilde{m}}_t^{(s)} = \frac{m_t^s - \hat{\delta}_s}{\hat{\theta}_s} \qquad (3.43)$$

$$= \frac{\theta_s}{\hat{\theta}_s}(r_t^{(s)} + \tau_t) + \frac{\delta_s - \hat{\delta}_s}{\hat{\theta}_s} + e_t^{(s)}$$

$$= r_t^{(s)} + \tau_t + e\delta_s - \tau_t e\theta_s + e_t^{(s)}$$

Defining $\tilde{\tilde{m}}_t = [\tilde{\tilde{m}}_t^{(0)}, \tilde{\tilde{m}}_t^{(1)}, \ldots, \tilde{\tilde{m}}_t^{(M-1)}]$ and calculating the covariance, $$\Sigma_t = \text{var}[B\tilde{\tilde{m}}_t] = B\left(\begin{bmatrix} 0 & 0 \\ 0 & G_\delta G_\delta^T \end{bmatrix} + \begin{bmatrix} 0 & 0 \\ 0 & G_\theta G_\theta^T \tau_t^2 \end{bmatrix} + I\sigma_t^2\right)B, \qquad (3.44)$$

the optimal source position in the WLS sense reduces to the following optimization problem:

$$\text{argmin}_{p_t}\left(B\left(\tilde{\tilde{m}}_t - \frac{1}{c}\|p_t - q_s\|\right)\right)^T \Sigma_t^{-1}\left(B\left(\tilde{\tilde{m}}_t - \frac{1}{c}\|p_t - q_s\|\right)\right) \qquad (3.45)$$

Thus, controller 28 can synchronize a sensor network with skewed, asynchronous clocks by measuring the TOA of a set of source signals. Using MVIE to get the initial guess helps avoid local minima in the cost function.
If the position of one source is known, the clock offset can be measured at the time of transmission at raw measurement accuracy. If a source transmits twice without changing position, then the clock skew of the sensors that sense it can be estimated directly at the accuracy of the raw measurement. Incorporating such measurements into the system model can increase the system accuracy. A source with known location can also be a sensor that is allowed to transmit. Periodic sources (such as some transmitting satellites) usually have a transmission period that is very short, so that adjacent transmissions have essentially the same position.
As noted earlier, the MVIE estimate together with its accuracy estimation can also be used as a priori probability of the unknowns in a MAP estimator.
The MVIE of the normalized clock offset can be estimated at a few points in time to increase accuracy if needed.
Even without assuming that all sources are received by all sensors, the above algorithm will still perform well with only slight modifications.

Methods Using Combinations of Satellites and Terrestrial Sources

In the description that follows, system 20 is assumed (with full generality) to comprise a set of M sensors 22 at given locations $\{q_i\}_{i=0}^{M-1}$, a set of $N_s$ satellites 26 in orbit of unknown position $\{p_i^{(s)}\}_{i=0}^{N_s-1}$, and a set of $N_t$ terrestrial sources 24 of unknown position $\{p_i^{(t)}\}_{i=0}^{N_t-1}$. Denote by N the total number of sources received by the sensors $N \triangleq N_t + N_s$, and set the origin of the coordinate system at the center of the sensor network deployment area. The orientation of the coordinate system is set to North West Up.

The time offset of sensor s is $\delta^{(s)}$. Therefore, the TOA measurement of source t (satellite or terrestrial in origin) by sensor s is $$m_t^{(s)} = r_t^{(s)} + \tau_t + \delta^{(s)} + e_t^{(s)}, \quad (4.1)$$

wherein $\tau_t$ is the unknown transmission time of the signal, $r_t^{(s)}$ is the time of flight from source t to sensor s, and $e_t^{(s)}$ is zero mean Gaussian error whose standard deviation is $\sigma_t^{(s)}$.

By defining the vectors:

$$m_t \triangleq [m_t^{(1)}, m_t^{(2)} \ldots m_t^{(M)}]^T;$$

$$r_t \triangleq [r_t^{(1)}, r_t^{(2)} \ldots r_t^{(M)}]^T; r_t^{(s)} \triangleq 1/c \|q_s - p_t\|$$

$$1_M \triangleq [1, 1, \ldots 1]^T; \delta \triangleq [\delta_1, \delta_2 \ldots \delta_M]^T;$$

$$; e_t \triangleq [e_t^{(1)}, e_t^{(2)} \ldots e_t^{(M)}]^T.$$

the measurements of source t can be written in vector form as:

$$m_t = r_t + 1_M \tau_t + \delta + e_t. \quad (4.2)$$

We use the same notation for both terrestrial and satellite sources, wherein the indexes $t=0 \ldots N_t-1$ are used for terrestrial sources and the indexes $t=N_t \ldots N_t+N_s-1$ are used for satellite sources.

For the sake of simplicity in the formulation we make the assumptions:
1. All of the terrestrial sources are intercepted by all of the sensors with the same error standard deviation, $\sigma_T$.
2. All of the satellites are intercepted by all of the sensors with the same error standard deviation $\sigma_S$.

The problem to be solved is twofold:
1. Estimate the sensors clock offsets.
2. Estimate the source location using the available measurements.

For satellite signals the range $r_t^{(s)}$ can be written as:

$$r_t^{(s)} = \frac{1}{c} \|p_t - q_s\| \quad (4.3)$$

$$= \frac{1}{c} \sqrt{\|p_t\|^2 + \|q_s\|^2 - 2 q_s^T p_t}$$

$$= \frac{1}{c} \sqrt{\|p_t\|^2 + \|q_s\|^2} \sqrt{1 - \frac{2 q_s^T p_t}{\|p_t\|^2 + \|q_s\|^2}}$$

$$\approx \frac{1}{c} \|p_t\| \left(1 - \frac{q_s^T p_t}{\|p_t\|^2} - \frac{(q_s^T p_t)^2}{2\|p_t\|^4}\right)$$

$$\approx \frac{1}{c} \|p_t\| \left(1 - \frac{q_s^T p_t}{\|p_t\|^2}\right)$$

$$= \frac{1}{c} \|p_t\| - \frac{1}{c} q_s^T \bar{p}_t$$

Therefore the vector $r_t$ is approximated by $$r_t \approx \frac{1}{c} \|p_t\| 1_M - G \bar{p}_t \quad (4.4)$$

wherein $$G \triangleq \frac{1}{c} [q_0 q_1 \ldots q_{M-1}]^T \quad (4.5)$$

and $\bar{p}_t$ is a unit vector in the direction of $p_t$. The present methods use a projection of the range vector that is defined as:

$$\tilde{r}_t \triangleq B r_t \quad (4.6)$$

$$B \triangleq I - \frac{1}{M} 1 1^T.$$

This means that:

$$\tilde{r}_t \approx B \frac{1}{c} \|p_t\| 1_M - B G \bar{p}_t = -B G \bar{p}_t. \quad (4.7)$$

G is referred to as the geometry matrix. This approximation of the projected range vector is the reason that the satellites location can be described by two variables. For example, longitude and latitude, instead of three that are needed for a general point in space.

The second-order term in the Taylor expansion determines the approximation error. As an example, for GPS satellites at an orbital height of 20180 km, and a sensor network of 1 km diameter, the error term maximum value is:

$$\frac{(q_s^T p_t)^2}{2\|p_t\|^3} \leq \frac{\|q_s^T\|^2}{2\|p_t\|} = \frac{500^2}{2 \cdot 20180000} = 6.2 \text{ mm,} \quad (4.8)$$

In terms of clock synchronization, this is equivalent to an error of 18 ps. Looking at the approximation from the opposite direction, we may ask what is the maximal radius of the sensor network such that the approximation error is less then 1 m, for the same satellite orbital radius. We calculate:

$$\frac{\|q_s^T\|^2}{2\|p_t\|} = 1 \text{ m} \quad (4.9)$$

$$\|q_s\| = \sqrt{2 \cdot 20180000} = 6352 \text{ m.}$$

Neglecting the second order term is possible, as long as the possible deployment area of the network is limited. The results can be extended to wider-area networks, given crude information on the orbital radius of the satellites.

Returning to eq. (4.7), the domain of the vector $\tilde{r}_t$ is part of a subspace of $\mathbb{R}^M$. Due to the structure of G, $\tilde{r}_t$ resides in a two- or three-dimensional subspace of $\mathbb{R}^M$. The subspace will be two-dimensional for planar sensor configuration, and three-dimensional in the general case.

For ground-based sensor configurations, the domain of $\bar{p}_t$ is the three-dimensional unit half-sphere such that:

$$\bar{p}_t \cdot \bar{z} \geq 0, \quad (4.10)$$

wherein $\bar{z}$ is the unit vector pointing up. This inequality holds since from any point on the surface of the earth, the intercepted signals arrive from above the horizon. In the rare case of space sensor formations, we would have a whole unit sphere as the domain of $\bar{p}_t$. On the other hand, if we have any information on the whereabouts of source t, we can use it to reduce the domain of $\bar{p}_t$ to a specified solid angle segment. Although the present description focused on ground-based sensor configurations, it can be extended to more general cases with only slight modifications.

The vector $\tilde{r}_t$ is a linear transformation of $\bar{p}_t$, and therefore its domain is a linear mapping of the upper half of the unit sphere in $\mathbb{R}^3$ onto $\mathbb{R}^M$, which is a half ellipsoid in $\mathbb{R}^M$. Singular Value Decomposition (SVD) of $-BG$ reveals the exact shape of that half ellipsoid. We define the SVD of $-BG$ as:

$$-BG \triangleq U \begin{bmatrix} \Lambda_R \\ 0 \end{bmatrix} V^T \triangleq [R^T H^T] \begin{bmatrix} \Lambda_R \\ 0 \end{bmatrix} V^T, \quad (4.11)$$

wherein U and V are unitary square matrixes of size M×M, and 3×3 respectively; $\Lambda_R$ is the non negative singular value diagonal matrix of size 3×3 at most; R rows hold the left singular vectors related to the nonzero singular values; and the rest of the left singular vectors form the rows of H. The nonzero singular values define the lengths of the semi-axis of the ellipsoid, while the related left-singular vectors define the semi-axis of the ellipsoid.

When the sensor formation is planar, there are only two non-zero singular values in $\Lambda_R$. In this case the domain of $\tilde{r}_t$ is a two-dimensional full ellipsoidal disk in $\mathbb{R}^M$ As stated earlier for three-dimensional ground sensor formations, the domain of $\bar{p}_t$ is a half ellipsoid. To know which half of the ellipsoid is the domain, we need to find the plane that separate the two halves. The plane normal pointing into the domain direction $\bar{n}$ is:

$$\bar{n} = -BG\bar{z}, \quad (4.12)$$

This plane is not guaranteed to be aligned with the semi-axis of the ellipsoid. When the height variation of the sensor configuration is much smaller than the planar position variations, however, the plane normal is approximately aligned with the semi-axis of the ellipsoid.

In the above description, there was an implicit condition on the number of sensors. If there are only two sensors, then rank (BG)=1, and the domain of $BG\bar{p}_t$ is a line segment. Three sensors are always on a plane or a line, so that the domain $BG\bar{p}_t$ will be a line or an ellipsoidal disk. Only four sensors or more can be positioned in a non-planar configuration, and therefore make the domain of $BG\bar{p}_t$ a half ellipsoid as discussed.

ML Estimator

The ML estimator for terrestrial sources without clock skew was derived above for the localization of a general source using TOA measurements. The cost function to minimize in that case was:

$$Q \triangleq \sum_{t=0}^{N-1} \|m_t - r_t - 1_M \tau_t - \delta\|^2. \quad (4.13)$$

where $r_t$ is the vector of distances of the source t to all sensors, and $\tau_t$ is the unknown source transmission time. The configuration containing satellites and terrestrial sources of unknown position and transmission time fits this cost function. Assuming the satellite and terrestrial sources are measured with the same error statistics yields:

$$Q' \triangleq \sum_{t=0}^{N_T-1} \|m_t - r_t(x_t, y_t, z_t) - 1_M \tau_t - \delta\|^2 + \quad (4.14)$$

$$\sum_{t=N_T}^{N_T+N_S-1} \|m_t - r_t(\phi_t, \theta_t) - 1_M \tau_t - \delta\|^2$$

where $r_t$ ($x_t$, $y_t$, $z_t$) is the distance vector for a terrestrial source located at $p_t \triangleq [x_t, y_t, z_t]^T$, and $r_t$ ($\phi_t$, $\theta_t$) is the distance vector for a satellite source at azimuth $\theta_t$ and elevation $\phi_t$. The transmission times $\tau_t$ that minimize the cost function are given by:

$$\hat{\tau}_t = (1_M^T 1_M)^{-1} 1_M^T (m_t - r_t - \delta) \quad (4.15)$$

$$= \frac{1}{M} 1_M^T (m_t - r_t - \delta).$$

We now define:

$$B \triangleq I_M - \frac{1}{M} 1_M 1_M^T; \quad (4.16)$$

$$\tilde{m}_t \triangleq B m_t; \quad \tilde{r}_t \triangleq B r_t; \quad \tilde{\delta} \triangleq B \delta.$$

Substituting the transmission time estimates into the cost function and using these definitions gives:

$$Q' = \sum_{t=0}^{N_T-1} \|\tilde{m}_t - \tilde{r}_t(x_t, y_t, z_t) - \tilde{\delta}\|^2 + \sum_{t=N_T}^{N_T+N_S-1} \|\tilde{m}_t - r_t(\phi_t, \theta_t) - \tilde{\delta}\|^2 \quad (4.17)$$

Collecting all vectors for t=0, 1, . . . , $N_S+N_T-1$ now gives:

$$Q' = \|m - r - C\delta\|^2, \quad (4.18)$$

where $$m \triangleq [\tilde{m}_0^T, \tilde{m}_1^T \ldots \tilde{m}_{N_T+N_S-1}^T]^T; \quad r \triangleq [\tilde{r}_0^T, \tilde{r}_1^T \ldots \tilde{r}_{N_T+N_S-1}^T]^T;$$

$$e \triangleq [\tilde{e}_0^T, \tilde{e}_1^T \ldots \tilde{e}_{N_T+N_S-1}^T]^T; \quad C \triangleq [I_M, I_M \ldots I_M]^T. \quad (4.19)$$

Substituting the clock offsets into the cost function gives:

$$Q' = \left\| \left[I - \frac{1}{N} CC^T\right](m - r) \right\|^2. \quad (4.20)$$

Calculating the elements of r is straightforward for terrestrial sources. For satellite sources, we can use the fact that they are far away to write:

$$\tilde{r}_t \triangleq \lim_{R \to \infty} B r_t = -BG\bar{p}_t, \quad (4.21)$$

where R is the orbital radius of the satellite sources. Thus, finding the ML estimate requires a search in $3N_T+2N_S$ dimensions: three position coordinates for each terrestrial source and two bearing angles for each celestial source. As noted above, for ground-based sensor formations, the satellite directions are above the horizon. Therefore:

$$\phi_t \in \left(0, \frac{\pi}{2}\right). \quad (4.22)$$

This criterion limits the search interval.

To avoid a brute-force search over so many dimensions, an estimate of $\tilde{\delta}$ can be used to decouple the problems of estimating the terrestrial source positions and satellite directions. The following iterative procedure can then be used to solve the ML estimator:

1. Initialize: $\tilde{\delta}^{(0)} \leftarrow 0$; $Q'^{(-1)} \leftarrow \inf$; $n \leftarrow 0$
2. $Q'^{(n)} \leftarrow 0$
3. For each source $t=1, 2, \ldots, N$:
   (a) Estimate $p_t$ given $\tilde{\delta}^{(n)}$ by minimizing $\|\tilde{m}_t - \tilde{r}_t - \tilde{\delta}^{(n)}\|^2$
   (b) $Q'^{(n)} \leftarrow Q'^{(n)} + \|\tilde{m}_t - \tilde{r}_t(\hat{p}_t) - \tilde{\delta}^{(n)}\|^2$
4.

$$\tilde{\delta}^{(n+1)} \leftarrow \frac{1}{N} C^T (m-r).$$

5. If $Q'_\Delta{}^{(n)} = |Q'^{(n)} - Q'^{(n-1)}| < \epsilon$ then stop
6. Else $n \leftarrow n+1$, go to step 2.

If the computation is found to have converged (step 56 in FIG. 4), controller 28 synchronizes the clocks of sensors 22 based on the current value of $\tilde{\delta}$ (step 58). Depending on application requirements, the controller may either send actual synchronization values to the sensors, or it may simply record and apply appropriate corrections to the clock readings received from the sensors. The controller may also output or otherwise apply the source location values given by the current elements of r (step 60).

For every iteration of this algorithm, controller 28 performs $N_S+N_T$ nonlinear least square optimizations. To avoid convergence of the cost function to a local minimum (rather than the true minimum corresponding to the actual clock offsets and source positions), a good initial estimate of the source locations and/or clock offsets is useful. Such an estimate can reduce the computational load considerably by reducing the number of iterations required for convergence. In tracking applications, a previous estimate may be used as a good starting point, but in the absence of a previous estimate, other information may be used.

The following sections describe methods that can be used to find an initial point so that no more than a few iterations are needed. Moreover, given a good initial point, controller 28 can solve the original cost function using gradient methods, which are very effective.

Locating Satellite Direction

In the iterative method of FIG. 4, the direction of a satellite given a guess of the clock offset vector is required. In this section we present a Lagrange multiplier approach to finding the required direction, which may be preferable to grid search methods. For this purpose, the optimization of a set of satellite source locations can be written as follows:

Minimize $\|Bm_t + BG\bar{p}_t - B\delta\|^2$
$\bar{p}_t$

Subject to $\|\bar{p}_t\| = 1$.

We define:

$y \triangleq B\delta - Bm_t$ $A \triangleq BG.$ (4.24)

Then the Lagrangian is:

$$L = \|A\bar{p}_t - y\|^2 - \lambda(1 - \bar{p}_t^T \bar{p}_t) \quad (4.25)$$

$$\frac{\partial}{\partial \bar{p}_t} L = A^T(A\bar{p}_t - y) + \lambda \bar{p}_t$$

$$\frac{\partial}{\partial \lambda} L = 1 - \|\bar{p}_t\|^2.$$

Equating $$\frac{\partial}{\partial \bar{p}_t}$$

L to zero gives:

$(A^T A - I\lambda)\bar{p}_t = A^T y$ $$\bar{p}_t(A^T A - I\lambda)^{-1} A^T y. \quad (4.26)$$

Substituting the solution for $\bar{p}_t$ in the expression for $$\frac{\partial}{\partial \lambda} L$$

and equating to zero gives:

$$y^T A (A^T A - I\lambda)^{-1^T} (A^T A - I\lambda)^{-1} A^T y = 1. \quad (4.27)$$

$A^T A$ can be represented by SVD as:

$A^T A = V^T \Lambda V$ $$y^T A V^T (\Lambda - I\lambda)^{-1} (\Lambda - I\lambda)^{-1} V A^T y = 1. \quad (4.28)$$

Noting that $\Lambda \triangleq \text{diag}(\gamma_0, \gamma_1, \gamma_2)$, and defining $VA^T y \triangleq \alpha = [\alpha_0, \alpha_1, \alpha_2]^T$ we get:

$$\frac{\alpha_0^2}{(\gamma_0 - \lambda)^2} + \frac{\alpha_1^2}{(\gamma_1 - \lambda)^2} + \frac{\alpha_2^2}{(\gamma_2 - \lambda)^2} = 1. \quad (4.29)$$

This equation is equivalent to finding the roots of a sixth degree polynomial. An efficient numerical solution for the roots can be found by seeking the eigenvalues of the companion matrix of the polynomial. One way to reduce the complexity in runtime is by realizing that the $\gamma$ values are constant as long as the sensors are static, they are needed only once, at initialization.

After calculating the six possible values of $\lambda_{opt}$ and discarding any complex solutions, we place them in the equation for $\bar{p}_t$ to get possible directions of the satellite. Controller 28 can test which of the real solutions is the optimal one by evaluating the cost function for each possible value, thus assuring that the global optimum is chosen.

A weight matrix W may be used in the original problem:

Minimize $\|W(Bm_t + BG\bar{p}_t - B\delta)\|^2$ (4.30)
$\bar{p}_t$

Subject to $\|\bar{p}_t\| = 1$,

To solve the problem, y is replaced with Wy and A with WA. The use of the weight matrix extends the results to include correlated measurements and can be applied to reduce the dimension of the measurement vector, as explained below.

ML Decomposition for Satellite-Transmitted Signals

This section shows that the log likelihood cost function for signals from space can be divided into two separate cost functions. One is linear, while the other is nonlinear but is only three-dimensional. Controller 28 may decompose the cost function into such components in order to solve the problems of clock synchronization and satellite source direction more efficiently.

H and R are defined above as the null and range-space projectors of $B\bar{G}\bar{p}_t$. We define:

$$T \triangleq [H^T, R^T]^T. \tag{4.31}$$

The matrix T is a unitary matrix, since it is a square matrix with orthonormal rows. Multiplying the source measurements $m_t$ by T does not reduce the information in the measurements. Proceeding with the measurement of the satellite signals gives:

$$Tm_t = Tr_t + T1_M \tau_t + T\delta + Te_t \tag{4.32}$$

Solving the ML estimator then requires that controller 28 minimize the following cost function:

$$Q \triangleq \sum_{t=0}^{N_s-1} \|T(m_t - r_t - 1_M \tau_t - \delta)\|^2. \tag{4.33}$$

Transmission time is estimated as usual resulting in:

$$Q = \sum_{t=0}^{N_s-1} \|[H^T, R^T]^T (Bm_t - Br_t - B\delta)\|^2 \tag{4.34}$$

$$= \sum_{t=0}^{N_s-1} \|H(Bm_t - B\delta)\|^2 + \sum_{t=0}^{N_s-1} \|R(Bm_t - Br_t - B\delta)\|^2$$

since $HBr_t=0$ by definition of H.

We now define:

$$\delta^\perp \triangleq HB\delta$$

$$\delta^R \triangleq RB\delta. \tag{4.35}$$

Therefore:

$$Q = \sum_{t=0}^{N_s-1} \|HBm_t - \delta^\perp\|^2 + \sum_{t=0}^{N_s-1} \|RBm_t - RBr_t - \delta^R\|^2. \tag{4.36}$$

The two parts of the cost Q can be solved independently, thereby making the ML estimator simpler to compute. Because the measurement vectors $HBm_t$ and $RBm_t$ are uncorrelated, the estimation error covariance matrix is block diagonal. The ML estimators related to the two cost functions can thus be computed separately, as described below.

The ML estimator of $\delta^\perp$ can be derived from the partial cost function:

$$Q^\perp \triangleq \sum_{t=0}^{N_s-1} \|HBm_t - \delta^\perp\|^2. \tag{4.37}$$

For this purpose, we define:

$$m_t^\perp \triangleq HBm_t$$

$$e_t^\perp \triangleq HBe_t$$

$$m^\perp \triangleq [m_0^{\perp T}, m_1^{\perp T}, \ldots, m_{N_s-1}^{\perp T}]^T$$

$$e^\perp \triangleq [e_0^{\perp T}, e_1^{\perp T}, \ldots, e_{N_s-1}^{\perp T}]^T$$

$$C^\perp \triangleq 1_{N_s} \triangleq I \tag{4.38}$$

wherein ≜ is the Kronecker Product. Now we can write:

$$Q^\perp = \|m^\perp - C^\perp \delta^\perp\|^2. \tag{4.39}$$

The estimator of $\delta^\perp$ that minimizes the cost function is:

$$\hat{\delta}^\perp = \frac{1}{N} C^{\perp T} m^\perp. \tag{4.40}$$

It can be shown that $HBH^T$ is idempotent, and H can be chosen such that:

$$HBH^T = \begin{bmatrix} 0 & 0 \\ 0 & I \end{bmatrix}. \tag{4.41}$$

Furthermore, regardless of the source locations, the estimation accuracy depends only on the number of signals measured. The positions of sensors 22 also do not affect the estimation accuracy, as long as the sensors are confined to an area such that the linear approximation of the satellite ranges holds.

A single source is sufficient to establish an estimation of the null space projection of the clock offsets (although this is not the case for the range space). Estimating the clock offsets in null space is sufficient to localize terrestrial sources with reasonable accuracy. For a non-planar sensor configuration, sources confined to a plane can be localized if at least six sensors observe the signals, and for sources that are not in a plane at least seven sensors are required. For a planar sensor configuration, sources confined to a plane can be localized if at least five sensors observe the signals, whereas for sources that are not confined to a plane, at least six sensors are required.

The fact that we can choose H such that $HBH^T$ has zero off-diagonal elements can speed up the estimation process.

For satellite signals, the nonlinear part of the cost function can be expressed as follows:

$$Q^R = \sum_{t=0}^{N_s-1} \|RBm_t - RBr_t - \delta^R\|^2. \tag{4.42}$$

Controller 28 can estimate $\delta^R$ in the presence of $RBr_t$ as a nuisance parameter. In this calculation, since R=RB, the measurement vector $RBm_t$ elements are independent and identically distributed Gaussian random variables. The mode of calculation depends on the sensor formation: If the sensors are confined to a plane, then $RBr_t$ can be any value inside an ellipse, whereas if the sensor distribution is in 3D space, $RBr_t$ is distributed on a 3D ellipsoidal half shell, which enables better accuracy.

First we consider the case of a planar sensor configuration. In this case the problem of estimating $\delta^R$ is reduced to finding the possible centers of an ellipse of known dimensions given a set of points in the ellipse domain corrupted by noise. The set of possible centers can be found, for example, by calculating the mean of the points (which is guaranteed to be inside of the ellipse) and then expanding the set of possible points by propagating out from that point. Controller 28 can determine whether a point is in the domain of possible offsets by checking whether an elliptical disk with its center at that point include all of the measured points in its domain. Regardless of how the set of points is found, its mean can be written as $\hat{\delta}^R$, and its empirical covariance matrix as $\Sigma_R$.

For the case of a non-planar sensor configuration, because $RBr_t$ resides on a 3D ellipsoidal half-shell, estimating $\hat{\delta}^R$ is reduced to finding the ellipsoid center given a set of points that are located on the ellipsoid half shell in the noiseless case, or are near this shell in the noisy case. This problem can be solved in a number of ways, including high-dimensional ML estimation, low-dimensional iterative ML estimation, and ellipsoid surface fitting.

The high-dimensional ML estimator takes the range space cost function and minimizes it for all satellite directions $\bar{p}_t$ and range-projected clock offsets $\delta^R$. This is an optimization problem in $3+2N_S$ dimensions which is easy to solve as long as the number of satellites is small enough.

The low-dimensional iterative ML estimator is similar to the iterative ML algorithm described above, but is applied only to minimize the cost function with respect to satellite directions and a 3D $\delta^R$ vector. Each iteration solves two or three dimensions at a time and is inherently fast. This method uses a two-step iterative process: Until convergence do ML Estimation of $\delta^R$ given the current estimation of $\bar{p}_t$; and then update the values of $\{\bar{p}_t\}_{t=0}^{N_s-1}$ using ML estimation based on the new $\delta^R$ estimate. This step can be accomplished by the Lagrange multiplier technique presented above, using R as the weighting matrix W. This estimation process thus comprises an averaging operation followed by an eigenvalue calculation of a 6×6 matrix. This estimator is therefore fast as long as the iteration count is reasonable.

Estimation Clock Offset Range Space Using Ellipsoid Fitting

The surface fitting method uses the fact that an ellipsoid center is to be fitted to noisy points, which is again a 3D problem with fast convergence properties. It is based generally on techniques described by Ahn et al., in "Orthogonal Distance Fitting of Implicit Curves and Surfaces," *IEEE Transactions on Pattern Analysis and Machine Intelligence*, 24(5):620-638 (2002), which is incorporated herein by reference. This fitting method is a good approximation of the ML estimator and is relatively simple to apply in the present case since the ellipsoid to be fitted is of known shape and orientation, so the only parameters left to fit are the ellipsoid center coordinates.

The problem of 3D ellipsoid fitting can be framed as follows: Given the set of noisy points $\{RBm_t\}_{t=0}^{N_s-1}$, find the 3D ellipsoid center that minimizes the weighted sum of the squared distances from the noisy measurements to the ellipsoid. The cost function to minimize is thus:

$$C(a) = d^T P^T P d$$

$$d = [d_1, d_2, \ldots d_{N_s}]$$

$$d_i = \|x_i - x'_i(a)\| \quad (4.43)$$

Here a is the proposed ellipsoid center, x is the noisy point, x' is the closest point to x that is on the ellipsoid centered at a, $P^T P$ is a weighting matrix, and $d_i$ is the Euclidean distance between $x_i$ and $x'_i$. It is easier to consider x, x' in a coordinate system that is centered at a and aligned with the eigenvectors given by the rows of R. In that coordinate system the ellipsoid is given by the following implicit function:

$$F(x') = \frac{x'^2_1}{\lambda_1} + \frac{x'^2_2}{\lambda_2} + \frac{x'^2_3}{\lambda_3} - 1 = 0 \quad (4.44)$$

wherein $x'=[x'_1, x'_2, x'_3]^T$, and $\lambda_i$ i=1, 2,3 are the non-zero eigenvalues of $BGG^T B^T$, related to the eigenvectors defined by the rows of R.

The ellipsoid center estimation may be carried out using the following orthogonal distance fitting algorithm to find the ellipsoid center â:

1. $\hat{a} \leftarrow \hat{a}_0$  $\Delta a \leftarrow \infty$  $k \leftarrow 0$
2. While $\|\Delta a\| > v_{thr}$
  2.1. For All measurements x, calculate x' using Eq. (4.45)
  2.2. Calculate $\Delta a$ using Eq. (4.47)
  2.3. $\hat{a} \leftarrow \hat{a} + \eta^k \Delta a$
  2.4. $k \leftarrow k+1$
  End While
3. Calculate cov(â) using Eq. (4.48)
4. $\delta^R \leftarrow \hat{a}$
5. $\Sigma^R \leftarrow cov(\hat{a})$ In step 2.2, x' can be found using a generalized Newton-Raphson method, starting from the initial guess $x'_0 = x$:

$$\frac{\partial f}{\partial x'}\bigg|_k \Delta x' = -f(x)|_k, \, x'_{k+1} = x'_k + \Delta x' \quad (4.45)$$

wherein:

$$f = \begin{bmatrix} \frac{x'^2_1}{\lambda_1} + \frac{x'^2_2}{\lambda_2} + \frac{x'^2_3}{\lambda_3} - 1 \\ -2x_1\lambda_2(x_2 - x'_2) + 2x_2\lambda_1(x_1 - x'_1) \\ -2x_2\lambda_3(x_3 - x'_3) + 2x_3\lambda_2(x_3 - x'_3) \end{bmatrix} \quad (4.46)$$

In step 2.2, $\Delta a$ is found using:

$$J^T P^T P J \Delta a = -J^T P^T P d$$

$$\Delta a = -(J^T P^T P J)^{-1} J^T P^T P d|_k$$

$$\hat{a}_{k+1} = \hat{a}_k + \eta^k \Delta a \quad (4.47)$$

wherein $$J \triangleq \frac{\partial d}{\partial a},$$

and $\eta \in (0,1)$ is a constant that helps convergence in noisy situations. In simulations, the inventors found it useful to set $\eta = 0.9$.

In step 3, the covariance is found using $$\delta R = \hat{a}$$

$$\Sigma_R = cov(\hat{\delta}^R) = \sigma_s^2 (J^T J)^{-1}. \quad (4.48)$$

The above algorithm for ellipsoid center estimation requires inverting matrices only of size 3×3. Because this algorithm uses the steepest descent at the ellipsoid center update, as defined by Δa, whereas the previous algorithm uses ML estimation of the center under the assumption that the satellites directions are known, the present algorithm may converge in fewer steps, although each step is a bit more complex.

Regardless of the method used to estimate the range space, it is important to start the iterative process with a good initialization of $\hat{a}$ (or $\hat{\delta}^R$) in order to avoid reaching a local minimum. The points to be fitted, assuming a small sensor height variation, reside on the upper or lower half of an ellipsoid, and the sign of $-RBG \cdot \bar{z}$ can be evaluated to identify the part of the ellipsoid on which the points are located. (If the height variation is significant, then the initial guess is different but can still be derived in a straightforward manner.) A good initial guess for the ellipsoid center, $\hat{a}$, would put the measured points in the vicinity of the correct half of the ellipsoid. Such an initial guess could be performed as follows:

1. Set $\overline{(RBm)}_{xy}$ equal the average for each of the x,y coordinates of $RBm_t$.
2. $\hat{a}_{0_{xy}} \leftarrow \overline{(RBm)}_{xy}$
3. Define: $\epsilon > 0$
4. if $-RBG \cdot \hat{z} \geq 0$
  4.1 $\hat{a}_{0_z} \leftarrow \min((RBm)_z) - \epsilon$
5. Else
  5.1 $\hat{a}_{0_z} \leftarrow \max((RBm)_z) + \epsilon$
EndIf
6.

$$\hat{a}_0 \leftarrow [\hat{a}_{0_{xy}}^T \quad \hat{a}_{0_z}]^T$$

Fusing Null and Range Space Clock Offset Estimates

By combining the above estimates for the null space and range space of the clock offset vector $B\delta$, controller 28 can now establish full synchronization of sensors 22 using satellite sources 26. For this purpose, the estimations of the range and null projections may be treated as the measurements:

$$\begin{bmatrix} \hat{\delta}^\perp \\ \hat{\delta}^R \end{bmatrix} = \begin{bmatrix} H \\ R \end{bmatrix} B\delta + \begin{bmatrix} nR \\ nH \end{bmatrix} \triangleq TB\delta + n. \tag{4.49}$$

The error elements $n_H$, $n_R$ have the covariance matrices $\Sigma_{\hat{\delta}^\perp}$ and $\Sigma^R$ respectively and are uncorrelated. Since $\Sigma_{\hat{\delta}^\perp}$ is singular, the ML solution is given by:

$$\widehat{B\delta} = (T^T \Sigma^\dagger T)^\dagger T^T \Sigma^\dagger \begin{bmatrix} \hat{\delta}^\perp \\ \hat{\delta}^R \end{bmatrix} \tag{4.50}$$

wherein $\Sigma \triangleq \text{blkdiag}(\Sigma_{\hat{\delta}^\perp}, \Sigma^R)$, and blkdiag is a block matrix whose blocks are the indicated matrices. Since T is unitary, the ML estimator becomes:

$$\widehat{B\delta} = T^T \Sigma T T^T \Sigma^\dagger \begin{bmatrix} \hat{\delta}^\perp \\ \hat{\delta}^R \end{bmatrix} \tag{4.51}$$

$$= T^T \begin{bmatrix} \hat{\delta}^\perp \\ \hat{\delta}^R \end{bmatrix}$$

$$\text{cov}(\widehat{B\delta}) = T^T \Sigma T.$$

To estimate the directions of the satellite sources, $\widehat{B\delta}$ is inserted into the ML cost function:

$$Q_t \triangleq \|B(m_t - r_t) - \widehat{B\delta}\|^2, \tag{4.52}$$

and controller 28 finds the solution that minimizes the cost for every satellite t. Alternatively, the Lagrange multipliers described above may be used for this purpose.

Thus, controller 28 is able to synchronize a set of sensors 22 deployed over a wide area using satellites having unknown orbital parameters and time references. The directions to the satellites are estimated as a by-product. The accuracy of the synchronization is only limited by the radio bandwidth, signal/noise ratio (SNR), observation time, and the number of sources processed.

Locating Terrestrial Sources

Given only the null-space offset projection $\hat{\delta}^\perp$, controller 28 can establish synchronized time-based localization of terrestrial sources 24. This approach can be useful since estimating $\hat{\delta}^R$ is more demanding, and cannot be accomplished by the above methods with fewer than three celestial signals. Moreover, this sort of localization enables estimation of the full clock offset vector $B\delta$, as explained below.

Although $HBr_t=0$ for celestial sources, this is not the case for terrestrial sources 24. Therefore, if there is a sufficient number of sensors 22 receiving terrestrial signals, it is possible to get a synchronized localization of the terrestrial sources by solving:

$$HBm_t = HBr_t + HB\delta + HBe_t$$

$$HBm_t - \hat{\delta}^\perp = HBr_t + e_{\hat{\delta}^\perp} + HBe_t \tag{4.53}$$

wherein $m_t$ is now the vector of TOA measurements of terrestrial source t, and $e_{\hat{\delta}^\perp}$ is the estimation error of $\hat{\delta}^\perp$.

Since the error $e_{\hat{\delta}^\perp}$ is uncorrelated with $e_t$, the expected estimation error under small error approximation is given by:

$$\text{cov}(p_t) = (L_t^T H^T \Sigma_t^\dagger H L_t)^{-1} \tag{4.54}$$

$$= \left(\frac{\sigma_S^2}{N_S} + \sigma_T^2\right)(L_t^T H^T HBH^T HL_t)^{-1}$$

$$= \left(\frac{\sigma_S^2}{N_S} + \sigma_T^2\right)(L_t^T L_t - L_t^T R^T RL_t)^{-1},$$

wherein $$L_t \triangleq \frac{\partial Br_t}{\partial p_t} = \frac{\partial \tilde{r}_t}{\partial p_t}.$$

Alternatively, controller 28 may locate terrestrial sources 24 using the fully-estimated offset vector and the terrestrial source sensor measurements:

$$Bm_t = Br_t + B\delta + Be_t \tag{4.55}$$

In this case, $p_t$ is found by minimizing:

$$\arg\min_{p_t}(Bm_t-Br_t-\widehat{B\delta})^T\tilde{\Sigma}_t^\dagger(Bm_t-Br_t-\widehat{B\delta})$$

$$\tilde{\Sigma}_t = T^T\Sigma T + B\sigma_T^2. \quad (4.56)$$

The expected estimation error under linear approximation is given by:

$$\text{cov}(p_t) = (L_t^T\tilde{\Sigma}_t^\dagger L_t)^{-1} \quad (4.57)$$

This estimation will thus provide better localization performance than the solution based only on null-space offset projection.

Refining Clock Offset Estimation Using Terrestrial Source

The accuracy of the clock offset estimation for sensors 22 may be improved by considering the localization of terrestrial sources 24. After refining the clock offsets, controller 28 can improve the localizations of the terrestrial sources and continue iterating to convergence. Convergence is assured, as improving the clock offset estimation accuracy increases the accuracy of localization of the terrestrial sources and of the directions of the satellite sources, and vice versa.

The ML estimator for $B\delta$ may be derived in this case as follows: The error of $\hat{p}_t$ is a vector in two or three dimensions, whereas $\hat{r}$ is a vector in M dimensions. We define the error vectors:

$$e_{p_t} \triangleq p_t - \hat{p}_t$$

$$e_{\tilde{r}_t} \triangleq \tilde{r}_t - \hat{\tilde{r}}_t \quad (4.58)$$

There is a linear relationship between the error vectors, assuming the error is small:

$$e_{\tilde{r}_t} = L_t e_{p_t} \quad (4.59)$$

The error covariance matrix of $\tilde{r}_t$ is given by:

$$\text{cov}(\hat{\tilde{r}}_t) = L_t \text{cov}(p_t) L_t^T, \quad (4.60)$$

which is clearly singular and of the same rank as $\text{cov}(p_t)$ (which is rank 2 or 3 depending on the sources distribution in a plane or in three dimensional space). Eigenvalue decomposition of $\text{cov}(\hat{r})$ gives:

$$\text{cov}(\hat{\tilde{r}}_t) = U_t \Lambda_t U_t^T$$

$$U_t = [R_t^T, H_t^T]$$

$$\Lambda_t = \text{diag}(\lambda_{t_1}, \lambda_{t_2}, \lambda_{t_3}, 0, \ldots, 0)$$

$$R_t R_t^T = I$$

$$H_t H_t^T = I, \quad (4.61)$$

where the rows of $R_t$ are the eigenvectors of $\text{cov}(\hat{\tilde{r}}_t)$ corresponding to the non-zero eigenvalues, while the rows of $H_t$ are the eigenvectors corresponding to the zero eigenvalue, and $\lambda_{t_3}=0$ in the case of planar sensor formation.

Now we calculate the covariance of $H_t e_{\tilde{r}_t}$:

$$\text{cov}(H_t e_{\tilde{r}_t}) = H_t U_t \Lambda_t U_t^T H_t^T \quad (4.62)$$

$$= H_t[R_t^T, H_t^T]\Lambda_t[R_t^T, H_t^T]^T H_t^T$$

$$= [0, I]\Lambda_t[0, I]$$

$$= 0$$

This expression means that the first two moments of the projected error $H_t e_{\tilde{r}_t}$ are zero, and under the assumption of Gaussian distribution yields:

$$H_t e_{\tilde{r}_t} = 0, \text{ Almost Sure}. \quad (4.63)$$

Since $p_t$ is unknown, the evaluation of $L_t$ and $\text{cov}(p_t)$ is performed using the estimate of $p_t$.

Coming back to the source measurement equation, multiplying from the left by $H_t$ gives:

$$H_t B m_t = H_t \tilde{r}_t + H_t B\delta + H_t B e_t \quad (4.64)$$

This equation is modified to compensate by $\hat{\tilde{r}}_t$:

$$H_t(Bm_t - \hat{\tilde{r}}_t) = H_t e_{\tilde{r}_t} + H_t B\delta + H_t B e_t \quad (4.65)$$

$$= H_t B\delta + H_t B e_t,$$

The result is a linear measurement of a projection of the sensor clock offsets vector. Concatenating measurements from all of the terrestrial sources gives:

$$\begin{bmatrix} H_0(Bm_0 - \hat{\tilde{r}}_0) \\ H_1(Bm_1 - \hat{\tilde{r}}_1) \\ \vdots \\ H_{N_t-1}\begin{pmatrix} Bm_{N_t-1} - \\ \hat{\tilde{r}}_{N_t-1} \end{pmatrix} \end{bmatrix} = \begin{bmatrix} H_0 \\ H_1 \\ \vdots \\ H_{N_t-1} \end{bmatrix} B\delta + \begin{bmatrix} H_0 B & & & 0 \\ & H_1 B & & \\ & & \ddots & \\ 0 & & & H_{N_t-1}B \end{bmatrix} \begin{bmatrix} e_0 \\ e_1 \\ \vdots \\ e_{N_t-1} \end{bmatrix}$$

which is completely independent of the localization errors.

Writing all of the equations we have on $B\delta$ at this point gives:

$$\begin{bmatrix} H_0(Bm_0 - \hat{\tilde{r}}_0) \\ H_1(Bm_1 - \hat{\tilde{r}}_1) \\ \vdots \\ H_{N_t-1}\begin{pmatrix} Bm_{N_t-1} - \\ \hat{\tilde{r}}_{N_t-1} \end{pmatrix} \\ \widetilde{HB\delta} \\ \widetilde{RB\delta} \end{bmatrix} = \begin{bmatrix} H_0 \\ H_1 \\ \vdots \\ H_{N_t-1} \\ H \\ R \end{bmatrix} B\delta + \begin{bmatrix} H_0 B & & & & & 0 \\ & H_1 B & & & \ddots & \\ & & \ddots & & & \\ & & & H_{N_t-1}B & & \\ 0 & & & & \sqrt{\frac{\sigma_S^2}{N_S}}HB & \\ & & & & & \sqrt{\Sigma_R} \end{bmatrix} \begin{bmatrix} e_0 \\ e_1 \\ \vdots \\ e_{N_t} \\ e^\perp \\ e_R \end{bmatrix}$$

The ML estimator is established using WLS with the following definitions:

$$m_{B\delta} \triangleq \begin{bmatrix} (H_0(Bm_0 - \hat{\tilde{r}}_0))^T & (H_1(Bm_1 - \hat{\tilde{r}}_1))^T & \ldots \\ (H_{N_t-1}(Bm_{N_t-1} - \hat{\tilde{r}}_{N_t-1}))^T & \widetilde{HB\delta}^T & \widetilde{RB\delta}^T \end{bmatrix}$$

-continued $$A_{B\delta} \triangleq [H_0^T \; H_1^T \; \ldots \; H_{N_t-1}^T \; H^T \; R^T]$$
$$\triangleq [H_T^T \; H^T \; R^T]$$

$$\sum_{H_T} \triangleq \sigma_T^2 blkdiag(H_0 B H_0^T, H_1 B H_1^T, \ldots, H_{N_t} B H_{N_t}^T)$$

$$\sum_{B\delta} \triangleq \sigma_T^2 blkdiag\left(\sum_{H_T}, \sum_{\delta^\perp}, \sum_R\right)$$

enables writing the estimator for $B\delta$ as:

$$\widehat{B\delta} = \left(A_{B\delta}^T \sum_{B\delta}^\dagger A_{B\delta}\right)^\dagger A_{B\delta}^T \sum_{B\delta}^\dagger m_{B\delta} \quad (4.66)$$

$$cov(\widehat{B\delta}) \triangleq \left(A_{B\delta}^T \sum_{B\delta}^\dagger A_{B\delta}\right)^\dagger$$

$$= \left[R^T \sum_R^\dagger R + H^T \sum_\perp^\dagger H + H_T^T \sum_{H_T}^\dagger H_T\right]^\dagger.$$

A similar formulation can be applied when the range space measurements are not used as part of the estimation process. In this case, the range measurements are simply omitted from the WLS formulation, and the position error covariance is modified accordingly. In the case of low SNR, performing a few iterations of this process provides a solid estimate even though the assumption in Eq. (4.63) does not hold perfectly at first.

At this point the only information that is left unused to improve the estimate of the clock offsets is the terrestrial measurements $R_t B m_t$. These measurements can be expressed as:

$$R_t(Bm_t - \hat{r}_t) = R_t B\delta + R_t Be_t + R_t e_{\hat{r}_t}, \quad (4.67)$$

This equation is solved iteratively, as the uncertainty in the values of the clock offsets is dependent on the uncertainty in the terrestrial source position, which is again dependent on the uncertainty in the clock offsets. Therefore, it is advantageous first to re-estimate the terrestrial source locations using the refined clock offsets. It is simpler to consider the original measurement for the second iteration:

$$Bm_t - \hat{r}_t = B\delta + Be_t + e_{\hat{r}_t} \quad (4.68)$$

It is a good approximation to say that these measurements are relatively uncorrelated to the clock offset estimations derived from the satellites signals, Since the little correlation that exists originates from the current position error, which is only partially correlated to the clock offset measurements derived from the satellites signals.

An expression may be developed as follows for the covariance matrix of:

$$m_T \triangleq [(Bm_0 - \hat{r}_0)^T, (Bm_1 - \hat{r}_1)^T, \ldots, (Bm_{N_T-1} - \hat{r}_{N_T-1})^T]^T. \quad (4.69)$$

For this purpose, the error element may be expressed as follows:

$$Be_t + e_{\hat{r}_t} = Be_t + L_t e_{p_t} \quad (4.70)$$

$$= Be_t + L_t \left(L_t^T \sum_t^\dagger L_t\right)^\dagger L_t^T \sum_t^\dagger L_t (Be_t + \widetilde{B\delta})$$

$$\triangleq Be_t + \tilde{L}_t (Be_t + \widetilde{B\delta})$$

$$= (I + \tilde{L}_t) Be_t + \tilde{L}_t \widetilde{B\delta}.$$

Now we can write the covariance matrix of $m_T$:

$$cov(m_T) \triangleq \Sigma_T$$

$$(\Sigma_T)_{i,i} = \sigma_T^2 (I + \tilde{L}_i) B (I + \tilde{L}_i)^T + \tilde{L}_i \Sigma_{B\delta} \tilde{L}_i^T$$

$$(\Sigma_T)_{i,j} = \tilde{L}_i \Sigma_{B\delta} \tilde{L}_j^T. \quad (4.71)$$

Combining all measurements of the sensor clock offsets finally gives:

$$\begin{bmatrix} m_T \\ \hat{\delta}^\perp \\ \hat{\delta}^R \end{bmatrix} = \begin{bmatrix} 1_{N_T} \otimes I \\ H \\ R \end{bmatrix} B\delta + n_T$$

$$\sum_{n_T} \triangleq E(n_T n_T^T) = blkdiag\left(\sum_T, \sum_\perp, \sum_R\right)$$

The optimal estimator is established using WLS. Defining the following:

$$y_f \triangleq [m_T^T, \hat{\delta}^{\perp T}, \hat{\delta}^{R T}]^T$$

$$A_f \triangleq [1_{N_T} \otimes I)^T, H^T, R^T]^T$$

$$\Sigma_f \triangleq blkdiag(\Sigma_T, \Sigma_\perp, \Sigma_R)$$

the estimator is given by:

$$\widehat{B\delta} = (A_f^T \Sigma_f^\dagger A_f)^\dagger A_f^T \Sigma_f^\dagger y_f$$

$$cov(\widehat{B\delta}) = (A_f^T \Sigma_f^\dagger A_f)^\dagger.$$

After estimating the clock offsets, controller 28 may again re-estimate the locations of terrestrial sources 24, and repeat until convergence as described above.

In some embodiments it is possible to skip the steps that use $RBm_t$ and return, or alternately do the final refinement using gradient methods on the original cost function and measurement vector.

Based on the above estimators, it can be shown that even with only one satellite source 26, it is possible to achieve accurate synchronization and localization as long as there is a terrestrial source 24 that is received by at least six or seven sensors (depending on whether they are distributed in a plane or in 3D space). In other words, for any combination of satellite sources 26 and terrestrial sources 24, as long as they are received by sufficient number of sensors 22, the estimators defined above are well posed and have performance directly related to the measurement error.

The Navigation Problem

The problem of navigation of a moving object in system 20 is equivalent to assuming that a sensor of unknown position is added to the network. This addition does not change the form of the measurement model. Considering only celestial sources, for example, the only difference is that now one row of the G matrix is unknown, and another clock offset is added.

Defining $s^T$ as the unknown sensor position and $\delta_s$ as its clock offset, the estimator may be written as:

$$Bm_t = -B\begin{bmatrix} G \\ s^T \end{bmatrix}\bar{p}_t + B\begin{bmatrix} \delta \\ \delta_S \end{bmatrix} + Be_t \quad (4.72)$$

$$= -B\left(\begin{bmatrix} G \\ 0 \end{bmatrix} + \begin{bmatrix} 0 \\ s^T \end{bmatrix}\right)\bar{p}_t + B\begin{bmatrix} \delta \\ 0 \end{bmatrix} + B\begin{bmatrix} 0 \\ \delta_S \end{bmatrix} + Be_t$$

Assuming $1^T\delta = 0$, as is expected from the estimation process of the clock offsets, leads to:

$$Bm_t = -B\begin{bmatrix} G \\ 0 \end{bmatrix}\bar{p}_t + B\begin{bmatrix} 0 \\ s^T \end{bmatrix}\bar{p}_t + \begin{bmatrix} \delta \\ 0 \end{bmatrix} + B\begin{bmatrix} 0 \\ \delta_S \end{bmatrix} + Be_t$$

Rearranging the equation gives:

$$Bm_t = \Gamma_t(\bar{p}_t, \delta) + A_t(\bar{p}_t)\begin{bmatrix} s \\ \delta_S \end{bmatrix} + Be_t,$$

wherein:

$$\Gamma_t(\bar{p}_t, \delta) \triangleq -B\begin{bmatrix} G \\ 0 \end{bmatrix}\bar{p}_t + \begin{bmatrix} \delta \\ 0 \end{bmatrix} \quad (4.73)$$

$$A_t(\bar{p}_t) \triangleq -B\begin{bmatrix} 0 & 0 \\ \bar{p}_t^T & -1 \end{bmatrix}.$$

Collecting the equations for all t gives:

$$m = \Gamma(\{\bar{p}_i\}_{i=0}^{N_S-1}, \delta) + A(\{\bar{p}_i\}_{i=0}^{N_S-1})\begin{bmatrix} s \\ \delta_S \end{bmatrix} + e,$$

wherein:

$$\Gamma(\{\bar{p}_i\}_{i=0}^{N_S-1}, \delta) \triangleq [\Gamma_0^T, \Gamma_1^T, \ldots, \Gamma_{N_S-1}^T]^T$$

$$A(\{\bar{p}_i\}_{i=0}^{N_S-1}) \triangleq [A_0^T, A_1^T, \ldots, A_{N_S-1}^T]^T. \quad (4.74)$$

Substituting for the satellite directions and the sensor clock offsets with their estimates (based on the methods described above without the use of the sensor of unknown position) gives:

$$m = \Gamma(\{\hat{\bar{p}}_i\}_{i=0}^{N_S-1}, \hat{\delta}) + A(\{\hat{\bar{p}}_i\}_{i=0}^{N_S-1})\begin{bmatrix} s \\ \delta_S \end{bmatrix} + e,$$

The navigation problem is thus reduced to a weighed least squares estimation of the values:

$$\begin{bmatrix} \hat{s} \\ \hat{\delta}_S \end{bmatrix} = (A^T A)^{-1} A^T (m - \Gamma). \quad (4.75)$$

This estimation can be used as an initial point for the minimization of the full ML cost presented in Eq. (4.13), with the only difference being that the position of one of the sensors is unknown. Starting from the initial estimate given by Eq. (4.75), controller 28 can use gradient methods to find the optimal point in terms of ML cost.

The problem framed above can be extended to the case of multiple sensors of unknown position by solving the LS estimation for each of these sensors. The ML estimator can use these initial estimates to find the optimum of the full ML cost, and in so doing also refine the estimates of the known sensors clock offsets and the satellite directions. Terrestrial sources can also be incorporated into the ML cost function.

APPLICATION EXAMPLES

Figure 5:
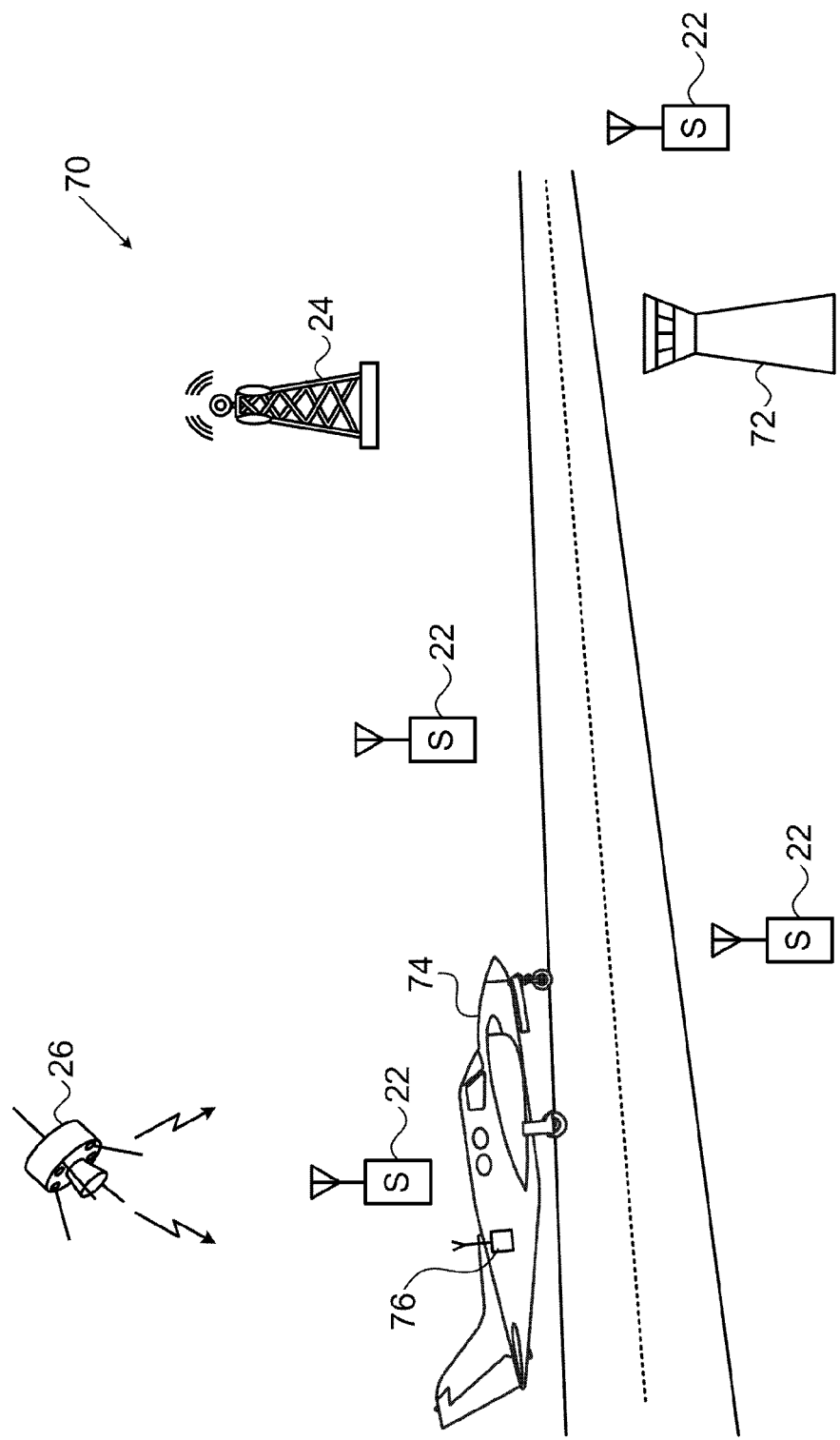
FIG. 5 is a schematic, pictorial illustration of a navigation system based on a sensor network, in accordance with an embodiment of the present invention.

FIG. 5 is a schematic, pictorial illustration showing a navigation system 70 based on a network of sensors 22, in accordance with an embodiment of the present invention. The sensor network in this example is deployed in an airport, with controller 28 housed in a control center 72. Airplanes 74 are also allowed to carry sensors 76 (or to be able to transmit or reflect a signal that sensors 22 can detect). Sources that can be used by the system include ground sources 24 (such as beacons, radar signals), aerial sources (airplane beacons 76), and sky sources (satellites 26). System 70 will be generally immune to jamming and spoofing, unlike GNSS systems.

There are two possible modes of navigation in system 70:
a. Standalone mode: The measurements of sensor 76 are used only to resolve its location and time offset. This mode is linear in the sensor position and clock offset, and therefore fast, and could be carried out by a processor (not shown) on board airplane 74.
b. Joint mode: The measurements of sensor 76 are also used to improve all other system estimates, including the positions and time estimates of other airplane sensor.

The arrangement shown in FIG. 5 enables accurate airplane navigation, and the measurements of airplane sensors 76 can also be used to improve system accuracy and integrity even further using the methods described above. As noted earlier, the readings of sensor 76 can be used to improve clock synchronization, terrestrial source localization and satellite direction accuracy. Navigation is still possible even if only terrestrial sources are present, although the processing required is typically more complex.

Figure 6:
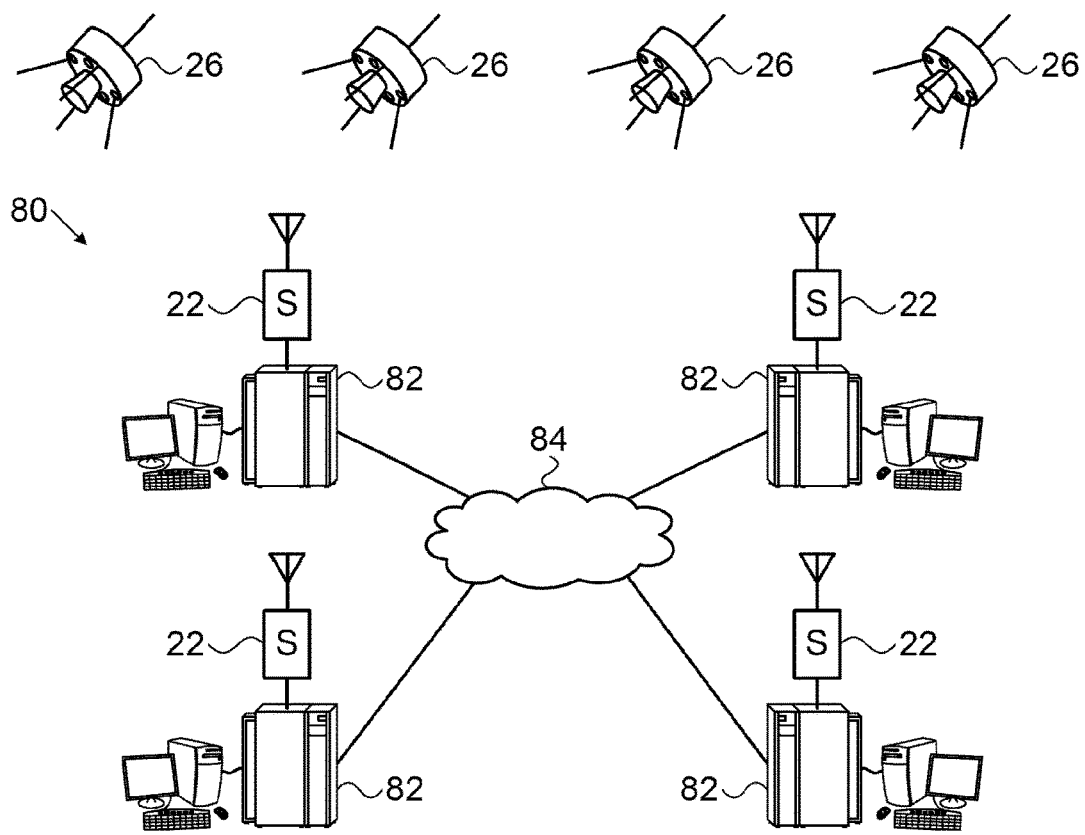
FIG. 6 is a schematic, pictorial illustration of a computer system with sensor-based synchronization, in accordance with an embodiment of the present invention.

FIG. 6 is a schematic, pictorial illustration of a computer system 80 with sensor-based synchronization, in accordance with an embodiment of the present invention. System 80 may comprise, for example, a computerized securities trading system, in which servers 82 are connected by a network 84 and user sensors 22 in accurately synchronizing their respective clocks based on signals from satellite sources 26.

Trading time is of great importance in such systems, and time-stamping is regulated by law. In systems that rely on GPS-based synchronization, if the GPS receiver is jammed and accurate time stamping is not available, trading must stop until it is recovered. Spoofing of the trading system time could cause trades to be recorded at a loss.

In contrast to existing solutions, servers 82 use sensors 22 to implement spoof-proof and jamming-proof time-stamping, based on the methods of clock synchronization that are described above. As time transfer is enabled without the use of GNSS, the absolute time can be maintained by all servers 82, which are unlikely to be GNSS jammed at the same time, or the servers as a group could perform time holdover until the total jamming has passed. System 80 is thus able to maintain normal operation even under jamming attacks and to detect and reject attempts at source spoofing quickly and robustly.

Figure 7:
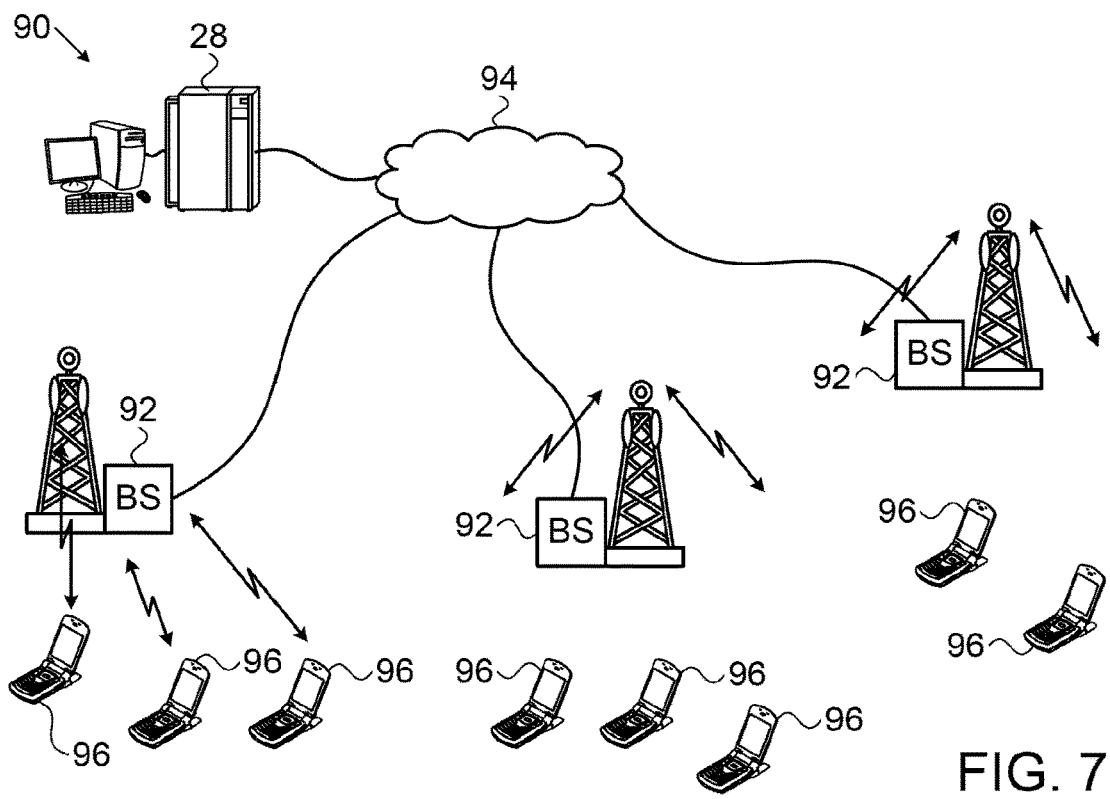
FIG. 7 is a schematic, pictorial illustration of a communication system with sensor-based synchronization, in accordance with an embodiment of the present invention.

FIG. 7 is a schematic, pictorial illustration of a communication system 90 with sensor-based synchronization, in accordance with an embodiment of the present invention. System 90 comprises multiple base stations (BS) 92, which are coupled via a network 94 to controller 28. The base stations collect TOA information gathered by user equipment 96, and controller 28 (or distributed controllers in base stations 92) uses this information in synchronizing the base station clocks. System 90 differs from the embodiments described above in that the positions of the sources (base stations 92) are known precisely, while the positions of the sensors (user equipment 96) may not be known accurately. Clock synchronization is accomplished, however, substantially as described above.

The precise synchronization that is achieved in system 90 can be used in various ways to improve network performance, such as reducing interference, increasing network capacity or bits per Hz, improving resource allocation, enabling Cooperative Multipoint (COMP) transmission in small and macrocell deployments, and supporting time-based localization techniques such as OTDOA (observed time difference of arrival), and UTDOA.

Assuming system 90 operates in accordance with the Long-Term Evolution (LTE) family of standards, clock synchronization in the system can be implemented as follows:
1. Collect OTDOA measurements or equivalent type of measurements from user equipment 96.
   a. Such measurements may be invoked by enabling active location request generation, which generates localization requests to the user equipment in the area of the base stations that are to be synchronized.
   b. If the user equipment also calculates its GPS position, the base stations may retrieve this information, as well, since then the UE will be regarded as a source (as well as a sensor) of known position and can improve performance as described above.
2. Process all measurements in controller 28, as described above, and return the user equipment positions and base stations clock offsets and, if needed, their frequency offsets.
3. Update the base stations clocks accordingly.

The rate at which the process is repeated is dependent on the stability of the base stations clocks relative to one another. Optionally, the rate at which the above process is performed can be reduced by modeling the dynamics of the changing clock offsets.

Although the above example, relates specifically to LTE, other mobile network technologies (such as UMTS) that provide OTDOA-like measurements can use the methods described herein.

One such measurement type is UTDOA (Uplink TDOA), which is performed by dedicated sensors called LMUs (Location Measurement Units). The LMU can be an integral part of the base station or a separate unit, installed on the base station or in another position. When using UTDOA measurements, the emitters are the user equipment (UE), and the LMUs are considered the sensors of known position. Using the methods described herein, the LMUs clocks are synchronized, while the UE locations are also resolved. Moreover, if the LMU clock is correlated to the base station clock, then the base stations and LMUs are also synchronized, enabling all of the benefits stated above and eliminating the need for a dedicated external synchronization unit in each LMU.

In another embodiment (not shown explicitly in the figures), sensors are used to gather information on the environment, and the locations of the sensors need to be determined (as in the case of Real Time Location Services, for example). These environmental sensors may be regarded as "sources" in the context of this embodiment, and localization of these sensors may be achieved based solely on the signals that they emit. The sensor measurements of these signals constitute the information gathered by the sensors that is relayed to a central node, so that no special transmissions are required for achieving sensor localization.

In such a network, in other words, there are two types of sensors:
1. Localization sensors 22 (which measure TOA), preferably of known position.
2. General sensing sensors, which gather sensing information on their environment (such as temperature, vibration, humidity, etc.) and serve as sources 24.

The synchronization that is achieved among the type 1 sensors can be used to efficiently manage the network.

In some embodiments, synchronization may be the major interest and not localization. This situation can arise when, for example, a wireless network needs to manage wakeup times of its nodes. An embodiment of the present invention provides a good solution for such cases, since emitters are usually present in any environment. Thus, even if only pairwise distances of the sensors are known, synchronization can be achieved to some extent.

Additionally or alternatively, the techniques described herein can be used to check whether an existing system is synchronized and calibrated properly with respect to time offsets and skews, i.e., to detect the occurrence of synchronization faults. If the clock offsets and skews derived using the methods described above do not match those in the existing system, there may be a malfunction in the hardware or software of the existing system. In this case, the time offset and skew of the system can be recalibrated based on the synchronization described by the above methods, and this synchronization can also be used to provide a backup clock or even a set of such clocks for the system, thus affording maximal availability and reliability.

Although the embodiments disclosed above relate specifically to problems of sensor synchronization and emitter localization (along with navigation and spoofing detection), other problems that can be formulated in an equivalent manner can be also solved by the methods that are described herein. For example, the principles of the techniques described in the present patent application may be extended to equivalent embodiments that arise from the time/frequency duality between DTOA measurements and differential Doppler measurements. All such solutions are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for transmitter operation, comprising:
receiving recorded time of arrival (TOA) measurements of transmitted signals from a plurality of sensors, at unknown locations, the signals being transmitted from at least a group of sources in a network of sources, which comprise respective clocks that are not mutually synchronized, and which are configured to transmit the signals at times determined according to the respective clocks, wherein the sensors do not serve as sources of the transmitted signals;
obtaining location information comprising respective source locations of the sources;
calculating synchronization values for the sources comprising at least one of respective offsets and skews of the clocks thereof as a function of the location information comprising the respective source locations, and the received recorded TOA measurements from the sensors, without dependence on measurements of transmissions emitted by the sensors to the sources; and
synchronizing the respective clocks of the sources or finding locations of the sensors based on the calculated synchronization values;
wherein calculating the synchronization values comprises applying an estimator to a set of equations relating the recorded TOA measurements, source synchronization values and the source and sensor locations;
wherein applying the estimator comprises applying an iterative optimization process to the set of the equations;
wherein the iterative optimization process iteratively calculate estimated locations of the plurality of sensors and intermediate synchronization values while taking into account a random measurement error and the respective source locations of the sources.

2. The method according to claim 1, wherein the network of sources comprises base stations in a cellular communications network, and the sensors comprise user equipment in the cellular communications network, and wherein calculating the synchronization values comprises calculating the synchronization values as functions of signals received by a plurality of the user equipments.

3. A network system, comprising:
a network of sources, which comprise respective clocks that are not mutually synchronized, and which are configured to transmit, at times determined according to the respective clocks, from at least a group of the sources, respective signals; and
a processor, which is configured to receive recorded time of arrival (TOA) measurements of the transmitted signals from a plurality of sensors, at unknown locations, to process the recorded TOA measurements, using location information comprising respective source locations of the sources, so as to calculate synchronization values for the sources comprising at least one of respective offsets and skews of the clocks thereof as a function of the location information comprising the respective source locations, and the received recorded TOA measurements from the sensors, without dependence on measurements of transmissions emitted by the sensors to the sources, and to synchronize the respective clocks of the sources based on the calculated synchronization values;
wherein the synchronization values are calculated by applying an estimator to a set of equations relating the recorded TOA measurements, source synchronization values and the source and sensor locations;
wherein applying the estimator comprises applying an iterative optimization process to the set of the equations;
wherein the iterative optimization process iteratively calculate estimated locations of the plurality of sensors and intermediate synchronization values while taking into account a random measurement error and the respective source locations of the sources.

4. The system according to claim 3, wherein the network of sources comprises base stations in a cellular communications network, and the sensors comprise user equipment in the cellular communications network, and wherein the processor is configured to calculate synchronization values as functions of signals received by a plurality of the user equipment.

5. The system according to claim 4, wherein the processor is configured to resolve respective equipment locations of the user equipment based on the signals received by the user equipment.

6. A a non-transitory computer-readable medium in which program instructions are stored, which instructions, when read by a computer, cause the computer to receive respective time of arrival (TOA) measurements of signals received by a plurality of sensors, at unknown locations, from at least a group of sources in a network of sources, which comprise respective clocks that are not mutually synchronized, and which are configured to transmit the signals at times determined according to the respective clocks, and to process the recorded TOA measurements, using location information comprising respective source locations of the sources, so as to calculate synchronization values for the sources comprising at least one of respective offsets and skews of the clocks thereof as a function of the location information comprising the respective source locations and the received recorded TOA measurements from the sensors, without dependence on measurements of transmissions emitted by the sensors to the sources, and to synchronize the respective clocks of the sources based on the calculated synchronization values;
wherein the synchronization values are calculated by applying an estimator to a set of equations relating the recorded TOA measurements, source synchronization values and the source and sensor locations;
wherein applying the estimator comprises applying an iterative optimization process to the set of the equations;
wherein the iterative optimization process iteratively calculate estimated locations of the plurality of sensors and intermediate synchronization values while taking into account a random measurement error and the respective source locations of the sources.

7. The method according to claim 1, wherein synchronizing the respective clocks comprises estimating offsets and skews between the respective clocks.

8. The method according to claim 1, wherein the method comprises computing the sensor locations based on the source locations and the recorded TOA measurements.

9. The method according to claim 1, wherein applying the iterative optimization process comprises performing a convex optimization.

10. The method according to claim 1, and comprising detecting a fault in the network based on the location information and the recorded TOA measurements.

11. The system according to claim 4, wherein the cellular communications network operates in accordance with a Long-Term Evolution (LTE) standard family, and wherein the user equipment is configured to make observed time difference of arrival (OTDOA) measurements based on the signals received from the base stations, and the processor is configured to perform at least one of synchronizing the operation of the base stations and finding locations of the user equipment based on the OTDOA measurements.

12. The system according to claim 3, wherein the processor is configured to estimate offsets and skews between the respective clocks.

13. The system according to claim 3, wherein the processor is configured to compute the sensor locations based on the source locations and the recorded TOA measurements.

14. The system according to claim 13, wherein the processor is configured to apply an estimator to a set of equations relating the recorded TOA measurements and the source and sensor locations in order to compute the sensor locations.

15. The system according to claim 14, wherein the processor is configured to apply the estimator to the set of the equations in an iterative optimization process.

16. The system according to claim 15, wherein the iterative optimization process comprises a convex optimization.

17. The system according to claim 3, wherein the processor is configured to detect a fault in the network based on the location information and the recorded TOA measurements.

18. The system according to claim 6, wherein the instructions cause the computer to compute the sensor locations based on the source locations and the recorded TOA measurements.

19. The method according to claim 2, comprising transmitting a localization request to sensors in an area of the sources to cause the user equipment to provide the recorded TOA measurements.

20. The system according to claim 3, wherein the TOA measurements comprise differential time of arrival measurements.

21. The system according to claim 3, wherein the TOA measurements comprise times of arrival.

22. The method according to claim 2, comprising resolving respective equipment locations of the user equipment based on the calculated synchronization values.

* * * * *